(12) United States Patent
Chernyshov et al.

(10) Patent No.: US 11,542,369 B2
(45) Date of Patent: Jan. 3, 2023

(54) ASPARTIC ACID ESTER-FUNCTIONAL POLYSILOXANES, THEIR PREPARATION AND USE THEREOF

(71) Applicant: Momentive Performance Materials GmbH, Leverkusen (DE)

(72) Inventors: Dmitry Chernyshov, Rimpar (DE); Hubertus Eversheim, Wermelskirchen (DE)

(73) Assignee: Momentive Performance Materials GmbH, Leverkusen (DE)

( * ) Notice: Subject to any disclaimer, the term of this patent is extended or adjusted under 35 U.S.C. 154(b) by 0 days.

(21) Appl. No.: 17/284,903

(22) PCT Filed: Oct. 16, 2019

(86) PCT No.: PCT/EP2019/078118
§ 371 (c)(1),
(2) Date: Apr. 13, 2021

(87) PCT Pub. No.: WO2020/079097
PCT Pub. Date: Apr. 23, 2020

(65) Prior Publication Data
US 2021/0363307 A1 Nov. 25, 2021

(30) Foreign Application Priority Data
Oct. 19, 2018 (EP) .................... 18201573

(51) Int. Cl.
*C08G 77/388* (2006.01)
*C07F 7/18* (2006.01)
*C08G 77/06* (2006.01)
*C09D 183/08* (2006.01)
*C08G 77/00* (2006.01)

(52) U.S. Cl.
CPC .......... *C08G 77/388* (2013.01); *C07F 7/1804* (2013.01); *C08G 77/06* (2013.01); *C09D 183/08* (2013.01); *C08G 77/80* (2013.01)

(58) Field of Classification Search
CPC .................................................. C08G 77/388
See application file for complete search history.

(56) References Cited

U.S. PATENT DOCUMENTS

| | | | | |
|---|---|---|---|---|
| 5,364,955 A * | 11/1994 | Zwiener | ............. | C07F 7/1804 556/420 |
| 6,001,946 A * | 12/1999 | Waldman | ............. | C08G 18/10 556/418 |
| 6,664,342 B1 * | 12/2003 | Kohler | ............. | C08G 81/00 525/464 |
| 8,877,859 B2 * | 11/2014 | Herzig | ............. | C08G 77/26 524/588 |
| 9,085,712 B2 | 7/2015 | Olson | | |
| 9,957,417 B2 | 5/2018 | Olson | | |
| 2014/0272424 A1 | 9/2014 | Olson | | |
| 2015/0291846 A1 | 10/2015 | Olson | | |
| 2016/0009971 A1 | 1/2016 | Wang et al. | | |
| 2016/0177132 A1 | 6/2016 | Smith et al. | | |

FOREIGN PATENT DOCUMENTS

| CN | 102268223 | | * 11/2012 |
|---|---|---|---|
| CN | 104312398 A | | 1/2015 |
| WO | 2013188176 A1 | | 12/2013 |

OTHER PUBLICATIONS

English language translation CN 102268223, Nov. 2012.*

\* cited by examiner

*Primary Examiner* — Margaret G Moore
(74) *Attorney, Agent, or Firm* — James C. Abruzzo

(57) ABSTRACT

The present invention relates to aspartic acid ester-functional polysiloxanes, their use in the manufacture of curable compositions using polyisocyanate crosslinkers, in particular, in the manufacture of coating compositions, cured compositions obtained from said curable compositions and articles comprising the cured compositions.

19 Claims, 1 Drawing Sheet

Comparative Example III:
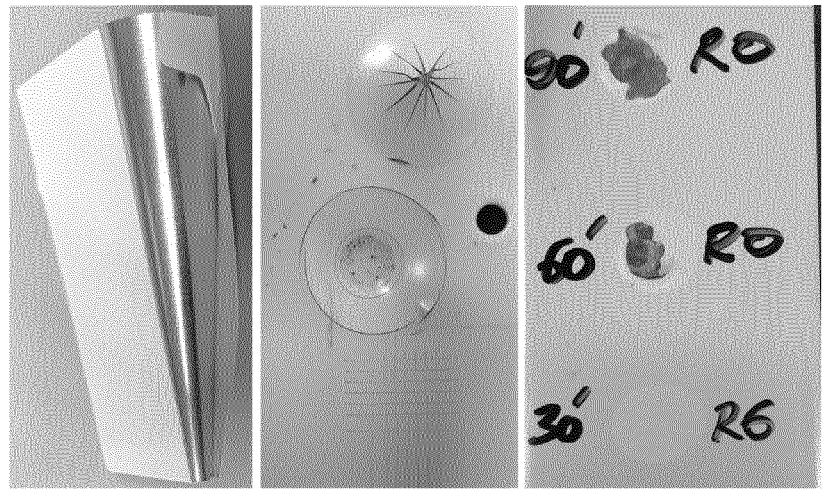
Example 8:
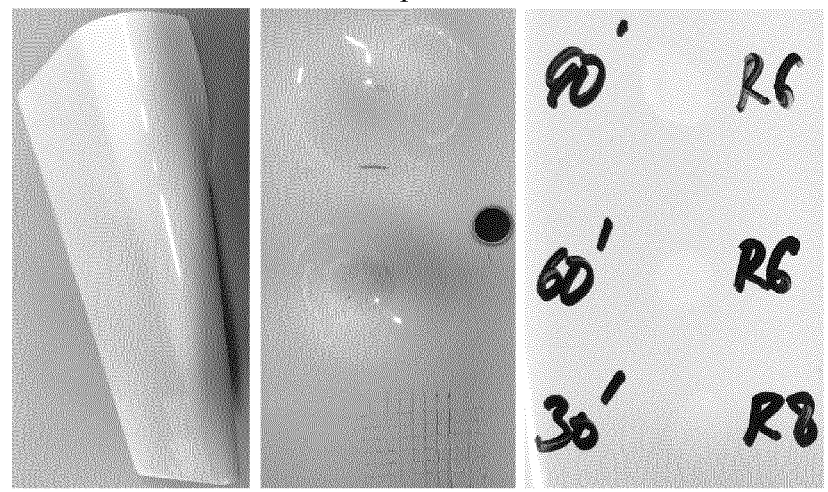
Mechanical properties and chemical resistance of experimental coating systems

ASPARTIC ACID ESTER-FUNCTIONAL POLYSILOXANES, THEIR PREPARATION AND USE THEREOF

FIELD OF INVENTION

The present invention relates to aspartic acid ester-functional polysiloxanes, their use in the manufacture of curable compositions using polyisocyanate crosslinkers, in particular, in the manufacture of coating compositions, cured compositions obtained from said curable compositions and articles comprising the cured compositions.

BACKGROUND OF THE INVENTION

Polymer coating systems containing reactive polyurethane and polyurea polymers in which the backbones contain urethane and/or urea groups are very well known in the art as a tough and durable compositions utilized in a wide variety of commercial applications in the construction, marine, industrial and automotive field. Notwithstanding the high performance characteristics of the polyurethane or polyurea based coating compositions such systems very often require additional adjustment of bending strength, elongation, impact flexibility and chemical resistance. Polysiloxanes are well known in the art as structural flexibilizers and impact resistance modifiers capable of improving outdoor durability and chemical resistance of polyurethane and polyurea coating systems. However direct incorporation of polysiloxanes into the polyurea or polyurethane matrix is not easy due to low compatibility of polysiloxanes with polyols or polyamines and low reactivity of polysiloxanes towards polyurea and/or polyurethane curing chemistries.

Polysiloxane polymers that have been modified with different functional groups including but not limited to hydroxyl functional group, amine functional group, thiol functional group and the like are known to one skilled in the art. Primary, secondary or tertiary amino-functional alkoxysilanes have been used to modify polysiloxane polymers. However, direct application of these aminosilane modified polysiloxane polymers in two-component polyurea or polyurethane systems is not practical due to the very high reactivity of amino functional groups towards polyisocyanate-type crosslinkers. Typically, such high reactivity results in a premature gelation of coating composition which results in two-component coating systems with unacceptable mixing pot life.

The application of aspartic acid ester-functional silanes and aspartic acid ester-functional silane modified prepolymers in coatings adhesives and sealants is known in the art. For example U.S. Pat. No. 6,001,946 discloses that polyaspartic silane end capped polyurethane prepolymers, where the alkoxysilyl-terminal group reacts with moisture to crosslink the polyurethane prepolymer, can be used for formulating adhesives and sealants.

These polyaspartic silane end capped polyurethane prepolymers do not provide for improvements in flexibility in coating formulations based on polyurethane and polyureas and have Tg's which provide for brittle compositions at low temperatures.

Other uses of aspartic acid ester-functional silanes are also known. For example, U.S. Pat. No. 9,085,712 discloses a two-part composition in which one part contains a polysiloxane, such as for example a methoxy-terminated polysiloxane, an aspartic acid ester containing silane and optionally a hydrolysable silane, and the second part contains polyisocyanate and a catalyst. The two-part compositions have several limitations, such as for example, the polysiloxanes have very limited miscibility with organic resins which makes direct application of polysiloxanes in combination with polyols problematic.

Aspartic acid ester-functional polysiloxanes are also known. For example, U.S. 2016/009971 A1 and CN 104312398 B disclose aspartic acid ester-functional polysiloxanes, which do not contain reactive alkoxysilyl-functional groups. These aspartic ester-functional polysiloxanes are not capable of crosslinking through the hydrolysis and condensation reactions of the reactive alkoxy-functional groups and are not able to chemically bond to metal substrates

SUMMARY OF THE INVENTION

To overcome the aforementioned problems, the present invention provides a specific aspartic acid ester-functional polysiloxane, which has a suitable balance of reactivity and pot-life. Such specific aspartic acid ester-functional polysiloxane provide for: (i) a very good compatibility with polyurea and polyurethane coating systems; (ii) a polyurea and/or polyurethane coating composition with improved mechanical properties and chemical resistance; (iii) a two-component wet coating materials with pot life typical for standard two-component polyurea and/or polyurethane coating compositions known in the art.

Accordingly, it was an object of the present invention to provide an aspartic acid ester-functional polysiloxane, which has sufficient reactivity and pot-life in polyisocyanate-based curing compositions, is compatible with polyurea and/or polyurethane coating compositions and allows for polyurea and/or polyurethane compositions having improved bending flexibility, impact resistance, elongation and chemical resistance, and which provide improved corrosion resistance to metal substrates.

Another aspect of the present invention is to provide for two-component coating compositions, which are based on polyisocyanate polyol (polyurethane) or polyisocyanate polyamine (polyurea) curing chemistry, and contain at least one aspartic acid ester-functional polysiloxane of the present invention. The aspartic acid ester-functional polysiloxane of the present invention are highly compatible with polyurethane and/or polyurea resin precursors in the two-component composition. These two-component compositions have acceptable reactivity and pot life after mixing, and can be cured to polyurethanes and polyureas having improved bending flexibility, impact resistance, elongation and chemical resistance, and which provide improved corrosion resistance to metal substrates.

In accordance with the present invention an aspartic acid ester-functional polysiloxane is provided having the formula (I):

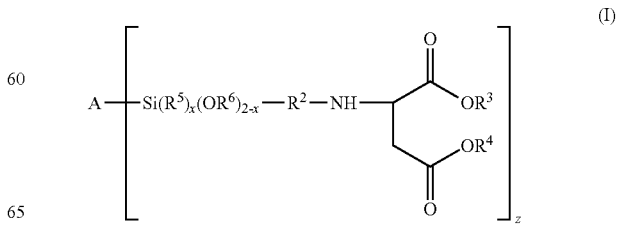

wherein

A is oxygen (—O—) or a polyorganosiloxanyl residue comprising at least one siloxy unit selected from the group consisting of $R^1_3SiO_{1/2}$, $R^1_2SiO_{2/2}$, $R^1SiO_{3/2}$ and $SiO_{4/2}$, wherein $R^1$ is an organic group and the polyorganosiloxanyl residue is bonded to Si via an oxygen atom, with the provisos that (i) if A is oxygen (—O—), then z is 2, and (ii) if A is a polyorganosiloxanyl residue, then the polyorganosiloxanyl residue contains at least two siloxy groups which can bond to the silicon atom;

each $R^2$ is independently selected from the group consisting of a straight chain alkylene group having from 1 to 10 carbon atoms, branched chain alkylene group having from 3 to 10 carbon atoms, a cycloalkylene group having from 3 to 10 carbon atom, an arylene group having from 6 to 12 carbon atoms, an aralkylene group having from 7 to 10 carbon atoms and an arenylene group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is an integer independently from 2 to 8, preferably 2, 3 or 4, and more preferably 2.

BRIEF DESCRIPTION OF THE DRAWING

The present invention will be described in further detail with reference to the accompanying drawing which comparatively illustrates coatings from Example 8 against Comparative Example III herein.

DETAILED DESCRIPTION OF THE PREFERRED EMBODIMENTS OF THE INVENTION

In the specification and claims herein, the following terms and expressions are to be understood as indicated.

The singular forms "a," "an," and "the" include the plural, and reference to a particular numerical value includes at least that particular value, unless the context clearly dictates otherwise.

Other than in the working examples or where otherwise indicated, all numbers expressing amounts of materials, reaction conditions, time durations, quantified properties of materials, and so forth, stated in the specification and claims are to be understood as being modified in all instances by the term "about".

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

It will be understood that any numerical range recited herein includes all sub-ranges within that range and any combination of the various endpoints of such ranges or sub-ranges.

As used herein, integer values of stoichiometric subscripts refer to molecular species and non-integer values of stoichiometric subscripts refer to a mixture of molecular species on a molecular weight average basis, a number average basis or a mole fraction basis.

In the description that follows, all weight percents are based upon total weight percent of the organic material(s) unless stated otherwise and all ranges given herein comprise all subranges therebetween and any combination of ranges and/or subranges therebetween.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "hydrocarbon group" or "hydrocarbon radical" means any hydrocarbon composed of hydrogen and carbon atoms from which one or more hydrogen atoms has been removed and is inclusive of alkyl, alkenyl, alkynyl, cycloalkyl, cycloalkenyl, cycloalkynyl, aryl, aralkyl and arenyl groups.

Groups can be composed of hydrocarbon groups containing at least one heteroatom and more specifically, a hydrocarbon group containing at least one heteroatom of oxygen, nitrogen or sulfur.

The term "alkyl" means any monovalent, saturated straight chain or branched chain hydrocarbon group; the term "alkenyl" means any monovalent straight chain or branched chain hydrocarbon group containing one or more carbon-carbon double bonds where the site of attachment of the group can be either at a carbon-carbon double bond or elsewhere therein; and, the term "alkynyl" means any monovalent straight chain or branched chain hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

As used herein, the siloxy units may use the shorthand notation for convenience. The shorthand notation is: M which represents $R^1_3SiO_{1/2}$, a monofunctional unit; D which represents $R^1_2SiO_{2/2}$, a difunctional unit; T which represents $R^1SiO_{3/2}$, a trifunctional unit; and Q, which represents $SiO_{4/2}$, a quadrifunctional (or tetrafunctional) unit. The notation follows the generally applied nomenclature of polyorganosiloxanes (see for example, Walter Noll, Chemistry and Technology of Silicones, page 3, Elsevier, 2012).

In accordance with the present invention an aspartic acid ester-functional polysiloxane has the formula (I):

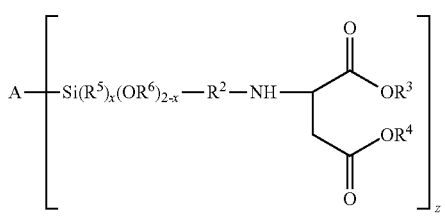

wherein

A is oxygen (—O—) or a polyorganosiloxanyl residue comprising at least one siloxy unit selected from the group consisting of $R^1_3SiO_{1/2}$, $R^1_2SiO_{2/2}$, $R^1SiO_{3/2}$ and $SiO_{4/2}$, wherein $R^1$ is an organic group and the polyorganosiloxanyl residue is bonded to Si via an oxygen atom, with the provisos that (i) if A is oxygen (—O—), then z is 2, and (ii) if A is a polyorganosiloxanyl residue, then the polyorganosiloxanyl residue contains at least two siloxy groups which can bond to the silicon atom;

each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene, especially when the 2,2-dimethylbutylene is bonded to the nitrogen and silicon atoms as

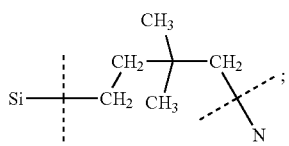

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is an integer independently from 2 to 8, preferably 2, 3 or 4, and more preferably 2.

In the present invention the group A being a polyorganosiloxanyl residue is to be understood in that it also includes the possibility that A is one difunctional unit D represented by $R^1_2SiO_{2/2}$ (so that z=2); one trifunctional unit T represented by $R^1SiO_{3/2}$ (so that z=3); or one quadrifunctional (or tetrafunctional) unit Q represented by $SiO_{4/2}$ (so that z=4).

In one embodiment A is preferably consisting of D units, that is, A is preferably a linear polydiorganosiloxanyl residue. However, in another embodiment of the invention, A can be also a branched polyorganosiloxanyl residue comprising T and/or Q units. The degree of branching does not necessarily correspond to the functionality z. For example A can be a branched polyorganosiloxanyl residue comprising a T unit, but there might be only a functionality of z=2. In such case one branch polyorganosiloxanyl residue can be terminated by, for example, an M unit. Generally however, the degree of branching corresponds to the functionality indicated by z. That is, a branched polyorganosiloxanyl residue comprising a T unit corresponds to z=3, and a branched polyorganosiloxanyl residue comprising a Q unit corresponds to z=4.

Preferred units D are selected from the group consisting of dimethylsiloxy, methylphenylsiloxy and diphenylsiloxy. Preferred units T are selected from the group of methylsiloxy and phenylsiloxy.

Linear hydroxyl-terminated polyorganosiloxane are known in the art and can be made by reacting diorganodihalosilane with water. Branched polysiloxane residues can be generated by incorporating of organotrihalosilane, such as for example, $PhSiCl_3$ or $MeSiCl_3$ (tri-functional monomer) and/or tetrahalosilanes, into the synthesis of the polysiloxane fluids in addition to the difunctional monomers such as $Me_2SiCl_2$, $MePhSiCl_2$, or $Ph_2SiCl_2$.

Triorganohalosilanes, such as for example, $Me_3SiCl$, can also be incorporated into the synthesis of the hydroxyl-containing polysiloxane as an end-blocker to reduce the functionality of the polysiloxane. Afterwards the resulting linear or branched hydroxyl-containing polysiloxanes are reacted with the amino-functional alkoxysilane and finally with maleate or fumarate esters or maleic or fumaric acids to generate the corresponding aspartic acid ester derivatives, which are discussed and prepared as described below in more detail.

In a preferred embodiment of the compound of the invention, A is $A^1$, a polyorganosiloxanyl residue comprising at least one siloxy unit selected from the group consisting of $R^1_3SiO_2$, $R^1_2SiO_{2/2}$, $R^1SiO_{3/2}$ and $SiO_{4/2}$, wherein $R^1$ is an organic group and the polyorganosiloxanyl residue is bonded to Si via an oxygen atom, with the proviso that the polyorganosiloxanyl residue contains at least two siloxy groups which can bond to the silicon atom depicted in formula (I). The proviso that the polyorganosiloxanyl residue contains at least two siloxy groups which can bond to the silicon atom includes the possibility that A or $A^1$ is one D group as shown in the following formula:

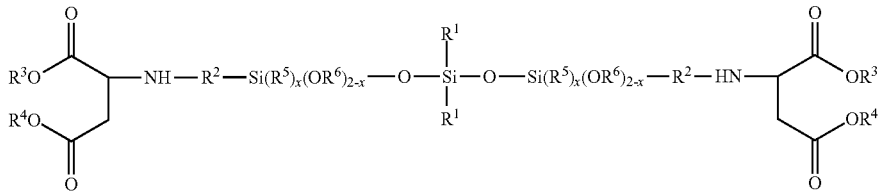

wherein $R^1$, $R^2$, $R^3$, $R^4$, $R^5$ and $R^6$ are each independently as defined above.

Likewise A or $A^1$ can be also one T or Q group, in which case z would be 3 or 4.

In a preferred embodiment of the compound of the invention, A is a polyorganosiloxanyl residue comprising from 1 to 2000, preferably 2 to 2000 siloxy units selected from M, D, T and Q as described above. A is therefore a linear or branched polyorganosiloxanyl residue. Normally in case of a linear polyorganosiloxanyl residue z=2, and in case of a branched polyorganosiloxanyl residue z is 3 to 8, preferable z is 3 or 4.

In case z is 2, A can be also oxygen (—O—), that is, the compound of the invention corresponds to the formula (II)

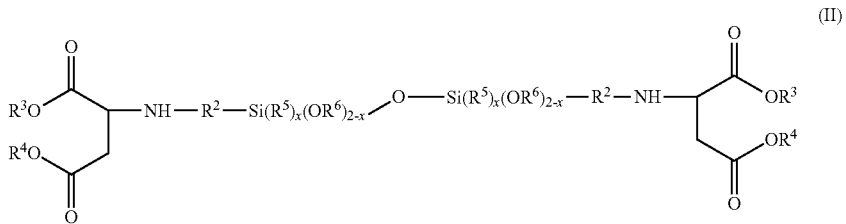

wherein each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms, preferably methyl, ethyl or propyl;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms, preferably methyl, ethyl and propyl;

x is an integer independently 0 or 1, preferably x is 0; and z is an integer independently from 2 to 8, preferably 2, 3 or 4, and more preferably 2.

In a preferred embodiment of the invention the compound has the following formula (III):

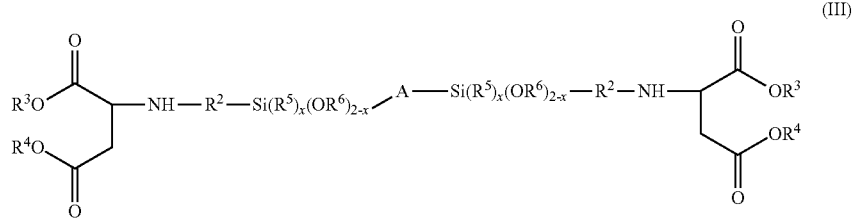

wherein

A is a group of the formula (IV):

wherein the subscript n is an integer in the range from 0 to 2000, preferably 1 to 2000, more preferably 2 to 2000, still more preferably 0 to 100, still more preferably 0 to 50, still more preferably 1 to 100, still more preferably 1 to 50, and $R^1$ is independently organic groups, $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethyl-butylene and more preferable 2,2-dimethylbutylene;

$R^3$ and $R^4$ are independently selected from the group consisting of a straight chain alkyl group of from 1 to 10 carbon atoms, a branched chain alkyl group having from 3 to 10 carbon atoms and a cycloalkyl group having from 3 to 10 carbon atoms, preferably methyl, ethyl or propyl;

$R^5$ and $R^6$ are independently selected from the group consisting of a straight chain alkyl group of from 1 to 10 carbon atoms, a branched chain alkyl group having from 3 to 10 carbon atoms and a cycloalkyl group having from 3 to 10 carbon atoms, preferably methyl, ethyl and propyl; and x is an integer independently selected from 0 or 1, preferably x is 0.

In a preferred embodiment of the invention $R^1$ is selected from aliphatic or aromatic groups, preferably selected from an n-alkyl, iso-alkyl, or tertiary alkyl having up to 30 carbon atoms, an alkoxyalkyl having up to 30 carbon atoms, cycloalkyl having from 5 to 30 carbon atoms, an aryl having from 6 to 30 carbon atoms, an alkylaryl having from 7 to 30 carbon atoms, which groups can be substituted in addition by one or more oxygen, nitrogen, sulfur and/or fluorine atoms, or poly($C_2$-$C_4$)-alkylene ethers with up to 500 alkylene oxy units, the groups $R^1$ being free of aliphatic unsaturation. Representative and non-limiting examples of suitable monovalent hydrocarbon radicals include alkyl radicals, preferably such as $CH_3$—, $CH_3CH_2$—, $(CH_3)_2CH$—, $C_8H_{17}$— and $C_{10}H_{21}$—, cycloaliphatic radicals, such as cyclohexylethyl, aryl radicals, such as phenyl, tolyl, xylyl, and aralkyl radicals, such as benzyl and 2-phenylethyl. Preferable monovalent halohydrocarbon radicals have the formula $C_mF_{2m+1}CH_2CH_2$— wherein m has a value of from 1 to 10, such as, for example, $CF_3CH_2CH_2$—, $C_4F_9CH_2CH_2$—, $C_6F_{13}CH_2CH_2$—, or halohydrocarbon radicals substituted with an oxygen, such as, for example, $C_2F_5$—O($CF_2$—$CF_2$—O)$_{1-10}CF_2$—, F[CF($CF_3$)—$CF_2$—O]$_{1-5}$—($CF_2$)$_{0-2}$—, $C_3F_7$—OCF($CF_3$)— and $C_3F_7$—OCF($CF_3$)—$CF_2$—OCF($CF_3$)—.

Preferred groups for $R^1$ are selected from alkyl and aryl, in particular, methyl, phenyl, 3,3,3-trifluoropropyl, and most preferred are methyl and phenyl.

In a preferred embodiment $R^1$ is independently selected from the group consisting of $R^{11}$ and $R^{12}$, and wherein $R^{11}$ is selected from aliphatic groups, preferably aliphatic hydrocarbyl groups, more preferably alkyl groups, still more preferably a methyl group, $R^{12}$ is selected from aromatic groups, preferably aromatic hydrocarbyl groups, more preferably an aryl group, still more preferably a phenyl group. Regarding the preferred embodiments of $R^{11}$ and $R^{12}$, it can be referred to those given for R above.

Preferably $R^2$ is independently selected from the group consisting of methylene, propylene, 2-methylpropylene and 2,2-dimethyl butylene, and even more preferred, 2,2-dimethylbutylene.

Preferably $R^3$ and $R^4$ are independently selected from the group consisting of an alkyl group having from 1 to 4 carbon atoms, preferably methyl or ethyl, most preferably ethyl.

Preferably $R^5$ and $R^6$ are independently selected form the group consisting of an alkyl group having from 1 to 4 carbon atoms, preferably methyl or ethyl.

In a preferred embodiment of the compound of the invention, $R^1$ is selected from aliphatic and aromatic groups, preferably $R^1$ is selected from alkyl and phenyl groups and still more preferably $R^1$ is selected from methyl and phenyl groups.

In a preferred embodiment of the compound of the invention, A is a polysiloxane residue having the formula (V):

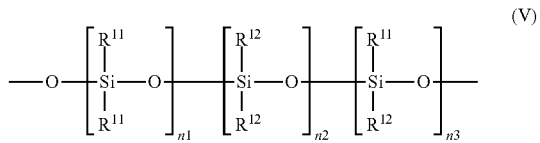

in which the units are arranged blockwise or randomly and in any order, and wherein $R^1$ is a monovalent aliphatic group, preferably an alkyl group of from 1 to 4 carbon atoms, more preferably methyl;

$R^{12}$ is a monovalent aromatic group, preferably an aryl group of from 6 to 12 carbon atoms, more preferably phenyl;

the subscripts n1, n2 and n3 are integers independently ranging from n1=0 to 2000, preferably 1 to 2000, more preferably 2 to 2000 and still more preferably 2 to 50;

n2=0 to 2000, preferably 1 to 2000, more preferably 2 to 2000 and still more preferably 0 to 50; and n3=0 to 2000, preferably 1 to 2000, more preferably 2 to 2000 and still more preferably 0 to 50; with the proviso that n1+n2+n3=n, where n is 1 to 2000.

In a preferred embodiment of the compound of the invention, A is a polysiloxane residue having siloxy units selected from the group consisting of dimethylsiloxy units, diphenylsiloxy and/or methylphenylsiloxy and having the formula (VI):

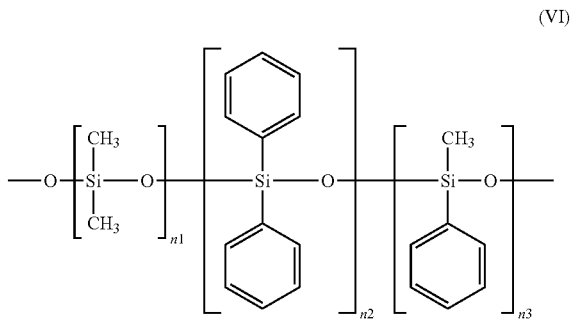

wherein n1, n2 and n3 are as defined above and wherein said formulas are arranged in any order, in particular, blockwise or randomly. Preferably the molar ratio n1:(n2+n3) is in the range of 100:1 to 1:10.

In a further preferred embodiment of the compound of the invention, A is a polysiloxane residue having formula (VI), wherein n1, and n2 are integers of form 1 to 2000, preferably 1 to 100, and more preferably 2 to 100, and n3 is zero, and wherein preferably the molar ratio n1:n2 is in the range of 100:1 to 1:10.

In a further preferred embodiment of the compound of the invention, A is a polysiloxane having the formula (VI), wherein n1 is 1 to 2000, preferably 1 to 100, more preferably 2 to 100, and n2 and n3 are zero.

In a further preferred embodiment the compound of the invention is selected from the group consisting of the formulas (VII) and (VIII):

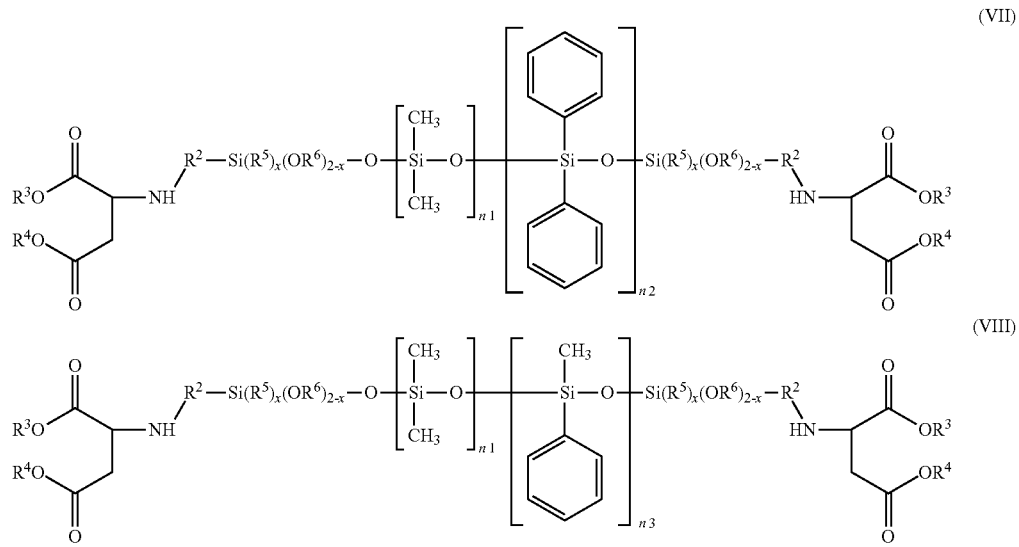

wherein
R² is independently a divalent alkylene group, preferably methylene, propylene, 2-methylpropylene and 2,2-dimethylbutylene and more preferably 2,2-dimethylbutylene;
R³ and R⁴ are independently selected from the group consisting of alkyl having from 1 to 4 carbon atoms, preferably methyl or ethyl and most preferably ethyl; and
R⁵ and R⁶ are independently an alkyl group and more preferably methyl or ethyl,
n1 is 1 to 1000, n2 is 1 to 1000 and n3 is 1 to 1000, preferably n1 is 2 to 100, n2 is 2 to 100, and n3 is 2 to 100, with the proviso that n1+n2+n3=n, where n is 2 to 2000, and wherein the dimethylsiloxy, diphenylsiloxy and methylphenylsiloxy groups can be arranged in any order.

In a further preferred embodiment the compound of the invention, R² is independently methylene, propylene, 2-methylpropylene and 2,2-dimethylbutylene, more preferably 2,2-dimethylbutylene; R³ and R⁴ are independently selected from the group consisting of alkyl having from 1 to 4 carbon atoms, preferably methyl or ethyl, most preferably ethyl; and R⁵ and R⁶ are independently selected from the group consisting of methyl or ethyl.

Particularly preferred compounds of the invention include:

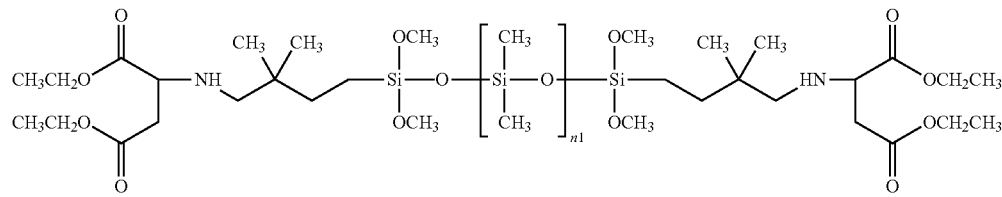

wherein n1 is about 4 to about 8 which is obtained from

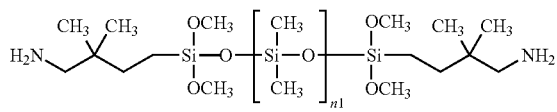

wherein n1 is from about 4 to 8, by Michael addition to diethyl maleate, and

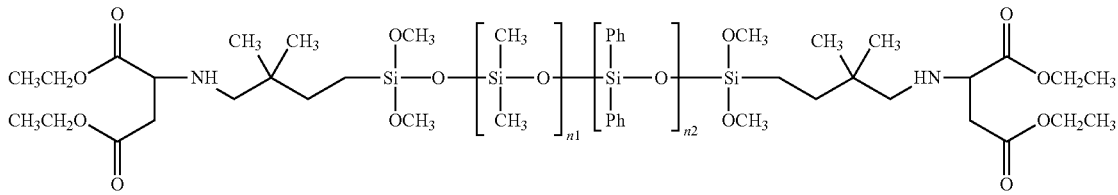

wherein Ph represent phenyl, n1 is from about 5 to about 10 and n2 is from about 2 to about 6, which is obtained from

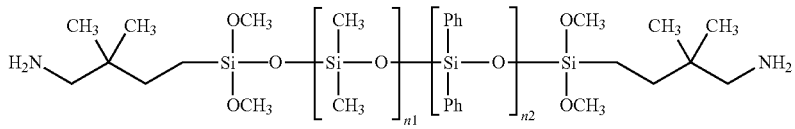

wherein Ph represents phenyl, n1 is from about 5 to about 10 and n2 is from about 2 to about 6 by Michael addition to diethyl maleate.

The compounds according to the present invention are preferably used for the manufacture of crosslinkable compositions, i.e. curable compositions, wherein these aspartic acid ester functionalized polysiloxane compounds according to the present invention react via their amino groups with functional groups which are reactive with active hydrogen groups, such as, for example, isocyanate groups of polyisocyanates or polyurethane or polyurea resins to be incorporated into the polymeric matrix of the cured compositions. The incorporation of the compounds of the present invention into the polymeric matrix of the cured compositions, which are in particular based on polyurethanes and polyureas, provides for an improved bending flexibility, impact resistance, elongation and chemical resistance of the cured compositions, and which provide corrosion resistance to metal substrates.

In a preferred embodiment of the invention the compound is used for the manufacture of crosslinkable compositions comprising polyisocyanates.

Polyisocyanates include various polyisocyanates, including in particular aliphatic, aromatic or cycloaliphatic polyisocyanates with an NCO functionality of greater than or equal to 2 and are known to one of ordinary skill in the art.

Representative and non-limiting examples of such suitable polyisocyanates include 1,4-butylene diisocyanate, 1,6-hexamethylene diisocyanate (HDI), isophorone diisocyanate (IPDI), 2,2,4-trimethylhexamethylene diisocyanate, 2,4,4-trimethylhexamethylene diisocyanate, bis(4,4'-isocyanatocyclohexyl)methane, isomeric mixture containing bis(4,4'-isocyanatocyclohexyl)methane of any desired isomer content, 1,4-cyclohexylene diisocyanate, 4-isocyanatomethyl-1,8-octane diisocyanate, 1,4-phenylene diisocyanate, 2,4-tolylene diisocyanate, 2,6-tolylene diisocyanate, 1,5-naphthylene diisocyanate, 2,2'-diphenylmethane diisocyanate, 2,4'-diphenylmethane diisocyanate, 4,4'-diphenylmethane diisocyanate, 1,3-bis(2-isocyanatoprop-2-yl)benzene, 1,4-bis(2-isocyanatoprop-2-yl)benzene, 1,3-bis(isocyanatomethyl)benzene, alkyl 2,6-diisocyanatohexanoates (lysine diisocyanates) with $C_1$-$C_8$-alkyl groups and mixtures thereof.

The polyisocyanates also include higher molecular oligomeric polyisocyanates which are prepared therefrom by using suitable modification reactions, such as e.g. trimerization or biuretizing. Hexamethylenediisocyanate and isophorone diisocyanate can be used as starting diisocyanates for preparing the corresponding polyisocyanates. Such oligomeric polyisocyanates are preferred in the present invention. They include polyisocyanates in which at least two generally equal diisocyanate units are bond to each other by reacting a part of the isocyanate groups, optionally by adding for example monohydric or polyhydric alcohols.

Particularly preferred oligomeric polyisocyanates are dimers, trimers or mixtures of dimers and trimers of a diisocyanate. Those oligomeric polyisocyanates have a higher molecular weight than the corresponding diisocyanates. An oligomeric polyisocyanate based on hexamethylene diisocyanate preferably has a molecular weight higher than 168.20 grams/mole. An oligomeric polyisocyanate based on isophorone diisocyanate preferably has a molecular weight higher than 222.29 grams/mole. In the sense of the present invention it is particularly preferred that the oligomeric polyisocyanates are obtained by reacting only one type of diisocyanate, as for example only hexamethylene diisocyanate or only isophorone diisocyanate as the diisocyanate unit. Preferably, the oligomeric polyisocyanates have a molecular weight less than 1500 grams/mole. Depending on the reaction conditions, different reactions of the diisocyanate units can occur to form the polyisocyanates.

Furthermore, the polyisocyanates also include the reaction products of diisocyanates with preferably low molecular weight polyols to form polyurethanes. Such polyols preferably have a molecular weight range of 62 to 400 grams/mole.

The reactions of the diisocyanate can form different functional groups, such as, for example, uretdione, isocyanurate, iminooxadiazindione, urethane, allophanate, biuret and/or oxadiazintrione groups. Oligomeric polyisocyanates, which have at least one of these functional groups, can be referred to as "derivatives" of the corresponding diisocyanates. In general, the synthesis the oligomeric polyisocyanates do not occur in the form of defined compounds but are mixtures of different oligomers, which have a molecular weight distribution. The oligomeric polyisocyanates can preferably include the following types of structures having the formulae (IX)-(XV), as disclosed in Nachrichten aus der Chemie (News from Chemistry), 55, 380-384 (2007):

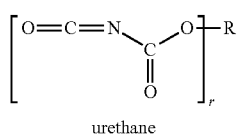

(IX)

urethane

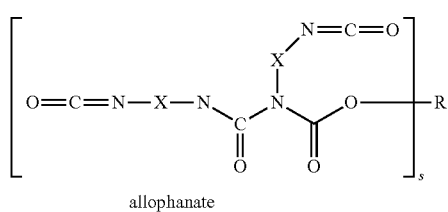

(X)

allophanate

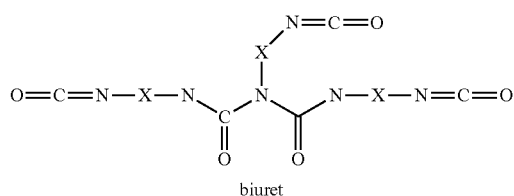

(XI)

biuret

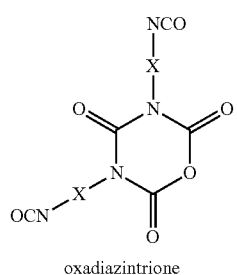

(XII)

oxadiazintrione

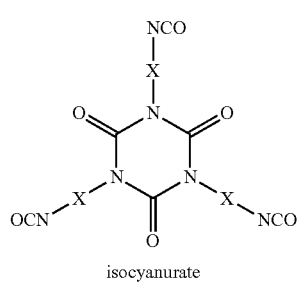

(XIII)

isocyanurate

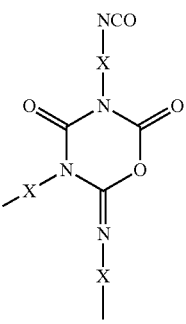

(XIV)

iminooxadiazindione

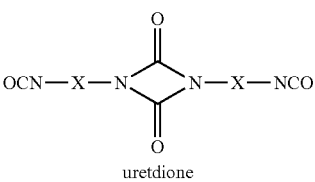

(XV)

uretdione wherein X is an aliphatic residue, R is an organic group, n is an integer ranging from 1 to 10, preferably 2 or 3, and m is an integer ranging from 2 to 10, preferably 2 or 3. The oligomeric polyisocyanates can contain at least one of these functional groups and may contain two or more of these different functional groups. Particularly preferred structures for X are —$CH_2CH_2CH_2CH_2CH_2CH_2$—, when it is an oligomeric polyisocyanate based on hexamethylene diisocyanate, or

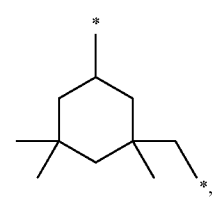

when it is an oligomeric polyisocyanate based on isophorone diisocyanate.

Preferred are thus oligomeric polyisocyanates, which have a functionality of ≥2, and are selected from uretdione, isocyanurate, urethane, allophanate, biuret, iminooxadiazinedione or oxadiazinetrione compounds of formulae (IX)-(XV), and also mixtures of these compounds, in particular containing trivalent or higher valent aliphatic groups on the polyisocyanates, such as biuret, allophanate, urethane and isocyanurates, and higher oligomers of diisocyanates, in particular, oligomers of hexamethylene diisocyanate, 1-isocyanato-3,3,5-trimethyl-5-isocyanatomethyl-cyclohexane and/or bis(isocyanatocyclohexyl)-methane. Specific examples of such polyisocyanates include, for example, the biuret of hexamethylene diisocyanate having the structure:

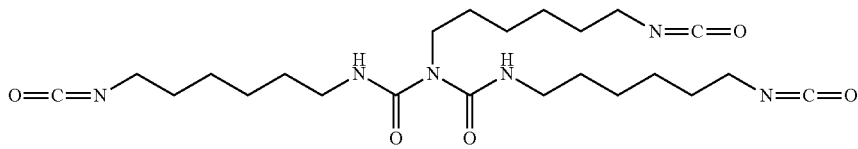 [SMILES: O=C=NCCCCCCNC(=O)N(CCCCCCN=C=O)C(=O)NCCCCCCN=C=O]

and oligomers thereof, which is commercially available from Covestro under the trade designation Desmodur® 100, the isocyanurate trimer of hexamethylene diisocyanate having the structure:

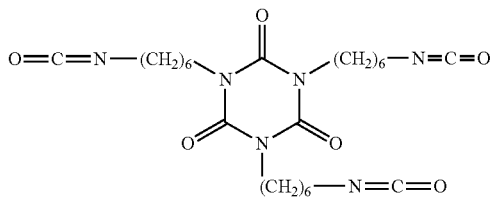

and commercially available from Covestro under the trade designation, Desmodur® N3300, N,N',N"-tris-[(4-isocyanato-1,3,3-trimethylcyclohexyl)methyl]isocyanurate, commercially available from Covestro under the trade designation, Desmodur® Z4470 or from Vencorex under the trade designation, Tolonate IDT 70B, higher oligomers thereof such as pentamers having the structure:

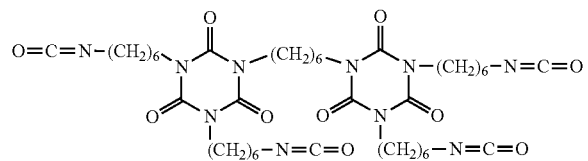

which is based on hexamethylene diisocyanate and the analogous pentamer based upon 4,4'-methylenebis(cyclohexyl isocyanate) or asymmetric trimers such as:

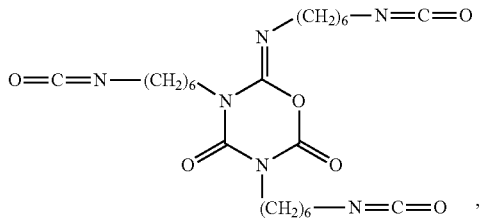

which is based on hexamethylene diisocyanate and the analogous asymmetric trimer based upon 4,4'-methylenebis(cyclohexyl isocyanate).

Particularly suitable polyisocyanates include isocyanates, or mixtures thereof, having an average NCO functionality of preferably 2.0 to 5.5, preferably 2.8 to 5.0 and more preferably of 3.0 to 4.5. The NCO content, based on the solids content of polyisocyanate, is preferably about 2 to about 50 weight percent, preferably about 10 to about 30 weight percent, and more preferably about 11 to about 25 weight percent. The content of monomeric diisocyanate in the polyisocyanate is preferably less than about 10 weight percent, more preferably less than about 2 weight percent and most preferably less than about 0.5 weight percent.

Particularly suitable polyisocyanates include polyisocyanate adducts containing biuret, isocyanurate, iminooxadiazine dione, uretdione, allophanate and/or urethane groups. The urethane groups are based on the reaction products of monomeric isocyanates with molecular weight polyfunctional alcohols such as trimethylol propane, 1,6-hexanediol, 1,5-pentanediol, diethylene glycol, triethylene glycol, 2,2,4-trimethyl-1,3-propanediol, neopentyl glycol and mixtures thereof. These polyisocyanate adducts are described, for example, in J. Prakt. Chem., 336, 185-200 (1994) and "Lackharze, Chemie, Eigenschaften und Anwendungen", publ. D. Stoye, W. Freitag, Hanser Verlag, Munich, Vienna 1996.

The polyisocyanate adducts may be prepared by the oligomerization of monomeric diisocyanates, as described for example in J. Prakt. Chem., 336, 185-200 (1994). Examples of suitable monomeric diisocyanates include 1,4-butane diisocyanate, 1,6-hexane diisocyanate, 3-isocyanatomethyl-3,3,5-trimethylcyclohexylisocyante (isophorone diisocyanate), 2-methyl-1,5-pentane diisocyanate, 2,2,4-trimethyl-hexamethylene diisocyanate, 1,12-dodecane diisocyanate, bis(isocyanatomethyl)norbornane and 4,4'-diisocyanato-cyclohexyl methane.

Particularly preferred are polyisocyanates containing isocyanurate groups (trimers) which have an NCO functionality of 3.0 to 4.5 and a monomer content of less than 2 weight percent. They may be prepared by the trimerization process described in EP 330,996. Furthermore, exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H. sub. 12MDI"), p-phenylene diisocyanate ("PPDI"), m-phenylene diisocyanate ("MPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"), xylene diisocyanate ("XDI"), p-tetramethylxylene diisocyanate ("p-TMXDI"), m-tetramethylxylene diisocyanate ("m-TMXDI"), ethylene diisocyanate, propylene-1,2-diisocyanate, tetramethylene-1,4-diisocyanate, cyclohexyl diisocyanate, 1,6-hexamethylene-diisocyanate ("HDI"), dodecane-1,1 2-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethylcyclohexane, methyl cyclohexylene diisocyanate, isocyanurate of HDI, triisocyanate of 2,4,4-trimethyl-1,6-hexane diisocyanate ("TMDI"), tetracene diisocyanate, naphthalene diisocyanate, anthracene diisocyanate, tris(4-isocyanatophenyl)methane (available from Covestro under the trade designation Desmodur R), 1,3,5-tris(3-isocyanato-4-methylphenyl)-2,4,6-trioxohexahydro-1,3,5-triazine (available from Covestro under the trade designation Desmodur IL), N-isocyanatohexyl-aminocarbonyl N,N'-bis(isocyanatohexyl)urea (available from Covestro under the trade designation, Desmodur N), 2,4,6-trioxo-1,3,5-tris(6-isocyanatohexyl)hexa-hydro-1,3,5-triazine (available from Covestro under the trade designation, Desmodur N3390), 2,4,6-tirioxo-1,3,5-tris(5-isocyanato-1,3,3-trimethylcyclohexylmethyl)hexahydro-1,3,5-triazine (available from Covestro under the trade designation, Desmodur N4370), 4,4'-dimethyldiphenylmethane-2,2',5,5-tetraisocyanate, 4-methyldiphenylmethane-3,5,2',4',6'-pentaisocyanate, and the like.

For better handling, the polyisocyanate (mixtures) can be diluted with up to about 50 weight percent of conventional solvents. Suitable solvents are those that are not reactive towards NCO groups, such as butyl acetate, ethyl acetate, 1-methoxy-2-propyl acetate, toluene, 2-butanone, xylene, 1,4-dioxane, N-methylpyrrolidone, dimethyl acetamide, dimethyl formamide and dimethyl sulphoxide.

One embodiment of the present invention is curable compositions comprising at least one aspartic acid esterfunctional polysiloxane according to the invention as defined above.

Preferably the curable compositions of the invention, comprise:
A) at least one aspartic acid ester-functional polysiloxane according to the invention as defined above;
B) at least one polyisocyanate; and
C) optionally one or more isocyanate-reactive compounds different from component A.

The isocyanate-reactive compounds different from component A are not particularly limited, but preferably includes a compound having within the molecule thereof two or more active hydrogen atoms having reactivity with the isocyanate group. Representative and non-limiting examples of the compound having within the molecule thereof two or more active hydrogen atoms include polyols, polyamines and polythiols. Among these, polyols and polyamines are preferable. Polyamines are particularly preferred. Specific nonlimiting examples of the polyol include polyester polyol, polyether polyol, acrylic polyol, polyolefin polyol and fluorine-containing polyol, preferably acrylic polyol and/or polyester polyol. These compounds, which have within the molecule thereof two or more active hydrogen atoms, may be used each alone or in combinations of two or more thereof.

The curable composition using the compound of the invention can be a solvent based or water based compositions. When a solvent based or water based curable composition is prepared, additives such as another isocyanatereactive compound, a catalyst, a pigment, a leveling agent, an antioxidant, an ultraviolet absorber, a light stabilizer, a plasticizer, a surfactant and other ingredients typically used in coatings may be added. The organic solvent or water is may be added, if necessary, to regulate the viscosity of the mixture. The isocyanate-reactive compound can be also added as a water dispersion or a water-solved form.

The polyester polyols can be obtained for example by the condensation reaction between, without being limited to, the following, a single acid or an acid mixture of dibasic acids such as carboxylic acids such as succinic acid, adipic acid, dimer acid, maleic anhydride, phthalic anhydride, isophthalic acid, terephthalic acid, and 1,4-cyclohexanedicarboxylic acid, and a single polyhydric alcohol or a mixture of polyhydric alcohols of ethylene glycol, propylene glycol, diethylene glycol, 1,4-butanediol, neopentyl glycol, 1,6-hexanediol, trimethylpentanediol, cyclohexanediol, trimethylolpropane, glycerin, pentaerythritol, 2-methylolpropanediol, and ethoxized trimethylolpropane. Moreover, for example, polycaprolactones obtained by ring-opening polymerization, using a polyhydric alcohol, of lactones such as s-caprolactone can also be used as polyester polyols.

Representative and non-limiting examples of the polyether polyols include for example polyether polyols obtained by random or block addition, to polyhydric hydroxy compounds, of a single alkylene oxide or a mixture of alkylene oxides, such as ethylene oxide, propylene oxide, butylene oxide, cyclohexene oxide and styrene oxide, by using a hydroxide, such as lithium, sodium, or potassium hydroxide, a strongly basic catalyst, such as an alcoholate, or an alkylamine, and composite metal cyan compound complex, such as metal porphyrin, or zinc hexacyanocobaltate complex; polyether polyols obtained reaction of an alkylene oxide with a polyamine compound, such as ethylenediamine; and so-called polymer polyols obtained by polymerizing acrylamide or the like by using these polyether polyols as media.

Representative and non-limiting examples of the polyhydric hydroxy compound include for example polyols such as diglycerin, ditrimethylolpropane, pentaerythritol and dipentaerythritol; sugar alcohol compounds such as erythritol, D-threitol, L-arabinitol, ribitol, xylitol, sorbitol, mannitol, galactitol and rhamnitol and saccharides, such as oligosaccharides.

The acrylic polyols can be obtained for example, by copolymerizing a polymerizable monomer having one or more active hydrogen atoms in one molecule thereof and another monomer copolymerizable with the aforementioned polymerizable monomer. Examples of active hydrogencontaining acrylic acid esters are 2-hydroxyethyl acrylate, 2-hydroxypropyl acrylate and 2-hydroxybutyl acrylate, or methacrylic acid esters, such as 2-hydroxyethyl methacrylate, 2-hydroxypropyl methacrylate, 2-hydroxybutyl methacrylate, 3-hydroxypropyl methacrylate and 4-hydroxybutyl methacrylate; polyhydric active hydrogen-containing (meth) acrylic acid esters, such as (meth)acrylic acid monoesters of triols such as glycerin and trimethylolpropane. Copolymerizable monomers include (meth)acrylic acid esters, such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, cyclohexyl methacrylate, lauryl methacrylate and glycidyl methacrylate, unsaturated carboxylic, acids such as acrylic acid, methacrylic acid, maleic acid and itaconic acid, unsaturated amides, such as acrylamide, N-methylolacrylamide and diacetone acrylamide, or hydrolyzable silyl group-containing vinyl monomers, such as vinyltrimethoxysilane, vinylmethyldimethoxysilane and γ-(meth)acryloxypropyltrimethoxysilane, and other polymerizable monomers, such as styrene, vinyltoluene, vinyl acetate, acrylonitrile and dibutyl fumarate.

Representative and non-limiting examples of the polyolefin polyol include polybutadienes having two or more hydroxyl groups, hydrogenated polybutadienes having two or more hydroxyl groups, polyisoprene having two or more hydroxyl groups and hydrogenated polyisoprene having two or more hydroxyl groups.

In a preferred embodiment the curable composition comprises at least one aliphatic polyamine. As used herein, "polyamine" refers to compounds having at least two amino groups, each containing at least one active hydrogen (N—H group) selected from primary amino and secondary amino groups. Exemplary aliphatic polyamines include aliphatic primary polyamines, aliphatic secondary polyamines, and combinations thereof. Exemplary non-limiting aliphatic primary polyamines include poly(oxypropylene)diamines, such as JEFFAMINE D-230 and JEFFAMINE D-400 from Huntsman, poly(oxypropylene)triamines, preferably with a molecular weight in the range of 400-5000 grams/mole, 1,4-diaminobutane, 1,2-ethylenediamine, 1,2-diaminopropane and 1,3-diaminopropane. Exemplary non-limiting secondary amines include cyclic aliphatic secondary diamines, non-cyclic aliphatic secondary diamines. Additional exemplary and non-limiting secondary amines include aspartic acid ester polyamines. Useful cyclic aliphatic secondary diamines comprise two, optionally substituted, hexyl groups bonded by a bridging group, wherein each of the hexyl rings comprises a secondary amine substituent as described for example in WO 2013/188176. Commercially available aliphatic cyclic secondary diamines having this structure include those available as CLEARLINK 1000 and CLEARLINK 3000 from Dorf Ketal Chemicals LLC. In another embodiment, useful aliphatic cyclic secondary diamines comprise a single hexyl ring. Commercially available cycloaliphatic secondary diamine having this structure are available for example as JEFFLINK 754 from Huntsman.

Useful aliphatic cyclic secondary diamines can be prepared by reaction of isophorone diamine and a compound having a Michael acceptor group that reduces the nucleophilicity of the resulting secondary amine groups. Representative Michael acceptors include acrylonitrile and α,β-unsaturated carbonyl compounds, with acrylonitrile typically preferred. In some embodiments, the alkylene group between the terminal —CN group and the amine group has at least two carbon atoms. Commercially available aliphatic cyclic secondary diamines having this structure include for example HXA CE 425 from Hanson Group LLC., and BAXXODUR PC-136 from BASF.

Exemplary non-cyclic aliphatic secondary diamines include N,N'-bis(3',3'-dimethylbutan-2-yl)-1,6-diaminohexane, available from Albemarle Corporation under the trade designation ETHACURE 90.

Particularly preferred polyamines are aspartic acid ester polyamines. These aspartic acid ester polyamines are polyamines with secondary amino groups that can be produced, for example, by addition of primary aliphatic diamines to maleic or fumaric acid dialkyl esters, or by addition of primary aliphatic amines to unsaturated oligoesters or polyesters. Useful aspartic acid ester polyamines include, for example, aspartic acid ester polyamines have the general formula (XVI):

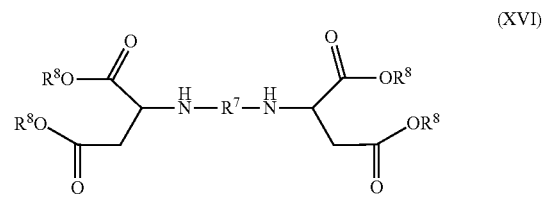

wherein $R^7$ is a divalent organic group having up to 40 carbon atoms, and each $R^8$ independently represents a lower alkyl group having 1 to 4 carbon atoms. For example, $R^8$ may be methyl, ethyl, propyl, or butyl. Preferably, $R^7$ represents a divalent aliphatic group, preferably having 1 to 20 carbon atoms, which can be, for example, branched, unbranched, or cyclic. More preferably, $R^7$ is selected from divalent hydrocarbon groups butylene, hexylene, 2,2,4-trimethylhexylene, or obtained by the removal of the amino groups from 1-amino-3,3,5-trimethyl-5-aminomethylcyclohexane, 4,4'-diamino-dicyclohexylmethane or 3,3-dimethyl-4,4'-diamino-dicyclohexylmethane. In some embodiments, $R^7$ is a branched C4 to C12 alkylene group.

Suitable aspartic acid ester amine resins are commercially available from Covestro under the trade designations DESMOPHEN NH 1420, DESMOPHEN NH 1520, and DESMOPHEN NH 1220. DESMOPHEN NH 1420 resin is substantially composed of the following compound:

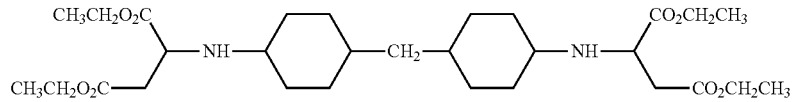

DESMOPHEN NH1520 resin is substantially composed of the following compound:

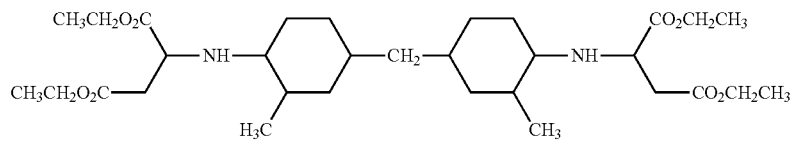

DESMOPHEN NH 1220 is substantially composed of the following compound:

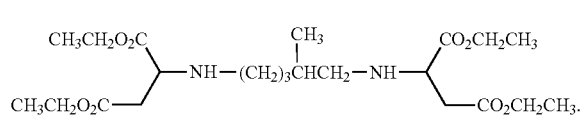

The aliphatic polyamine(s) may be combined with one or more aromatic polyamines. Suitable solid aromatic polyamines include alkyl anilines such as 4,4'-methylenebis (2-isopropyl-6-methylaniline) commercially available from Lonza under the trade designation LONZACURE M-MIPA, 4,4'-methylenebis(2,6-diisopropylaniline) commercially available from Lonza under the trade designation LONZACURE M-DIPA, 4,4'methylenebis(2-ethyl-6-methylaniline) and 4, 4'-methy lenebis(3-chloro-2, 6-diethylaniline) commercially available from Lonza under the trade designation LONZACURE MCDEA.

The one or more isocyanate-reactive compounds different from component A, the polyisocyanates composition can be used as such or mixed with organic solvents. The organic solvent is not particularly limited, but the organic solvent preferably has no functional group to react with a hydroxyl group and an isocyanate group and is preferably sufficiently compatible with the polyisocyanate composition. Examples of such an organic solvent include, without being limited to, the following compounds generally used as coating material solvents such as ester compounds, ether compounds, ketone compounds, aromatic compounds, ethylene glycol dialkyl ether-based compounds, polyethylene glycol dicarboxylate-based compounds, hydrocarbon-based solvents and aromatic solvents.

The coating composition may comprise various conventional additives such as a catalyst, a pigment, a leveling agent, an antioxidant, an ultraviolet absorber, a light stabilizer, a plasticizer and a surfactant.

Representative and non-limiting examples of the curing promoting catalyst include metal salts, such as dibutyltin dilaurate, tin 2-ethylhexanoate, zinc 2-ethylhexanoate and cobalt salts; and tertiary amines such as triethylamine, pyridine, methylpyridine, benzyldimethylamine, N,N-dimethylxcyclohexylamine, N-methylpiperidine, pentamethyldiethylenetriamine, N,N'-endoethylenepiperazine and N,N'-dimethylpiperazine.

The curable coating composition of the present invention can be used as, without being limited to, coating materials, for example, roll coating, curtain flow coating, spray coating, bell coating and electrostatic coating. For example, the coating composition of the present embodiment is also useful as the coating material for the primer or the upper and intermediate coating for the materials such as metals, including a steel plate and a surface-treated steel plate, plastic, wood, film, and inorganic materials. The coating composition of the present embodiment is also useful as the coating material for imparting, for example, aesthetics, weatherability, acid resistance, rust prevention and chipping resistance to, for example, precoat metal including anti-rust steel plates and vehicle coating. Moreover, the coating composition of the present embodiment is also useful as a urethane starting material for adhesives, pressure-sensitive adhesives, elastomers, foams and surface-treating agents.

Further the present invention relates to the cured compositions obtained by curing the curable compositions according to the invention.

The curable compositions according to the invention can be used for various application such as the manufacture of paints, coatings, adhesives, foams, encapsulants, such a polyurethane vacuum casting Resins, polyurethane quick cast resins, elastomer curing polyurethane cast resins, electrical potting compounds, edge casting compounds; polyurethane articles, such as mattresses, shoe soles, gaskets, hoses, floors, insulating materials, paints, adhesives, sealants, skis, car seats, running tracks in stadiums, dashboards, casting compounds, latex-free condoms and cast floors.

Further, the present invention relates to the articles comprising the cured compositions according to the invention.

Further the present invention relates to a coating composition comprising at least one aspartic acid ester-functional polysiloxane according to the present invention as described herein. In particular, coating compositions are those based on polyisocyanates as crosslinkers, but basically the aspartic acid ester-functional polysiloxanes of the present invention can be used in any amine-crosslinking coating compositions, such as epoxy resin compositions.

Further the present invention relates to a coating obtained by curing the curable compositions according to the present invention and the resulting composite articles, comprising at least one substrate having on at least a part of the surface thereof a cured composition containing at least one aspartic acid ester-functional polysiloxane according to the invention. Preferred substrates on which the coating composition of the present invention can be applied are for example selected from the group consisting of metal, plastic, concrete and wood. Preferred is in particular metal, which include all kinds of metals including those which are pretreated for example by galvanization.

The present invention further relates to a process for the manufacture of the aspartic acid ester-functional polysiloxanes according to the invention. Such processes preferably are selected from the group consisting of the following processes (A) to (C):

Process (A) comprises (a) reacting a silane compound of the formula (XVII):

(XVII)

with a compound of the formula (XVIII):

(XVIII)

to obtain an intermediate compound of the formula (XIX):

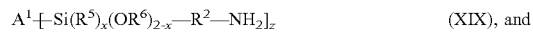

(XIX), and (b) reacting the intermediate compound of step (a) with a compound of the formula (XX):

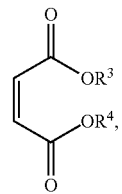

(XX)

to obtain the aspartic acid ester-functional polysiloxane of the formula (Ia):

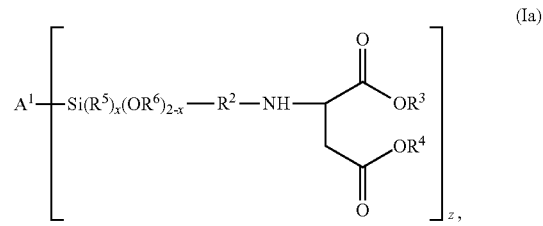

(Ia)

wherein $A^1$ is a polyorganosiloxanyl residue comprising at least one siloxy unit selected from the group consisting of $R^1_3SiO_{1/2}$, $R^1_2SiO_{2/2}$, $R^1SiO_{3/2}$ and $SiO_{4/2}$, wherein $R^1$ is an organic group and the polyorganosiloxanyl residue is bonded to Si via an oxygen atom, and the polyorganosiloxanyl residue $A^1$ contains at least two siloxy groups which can bond to the silicon atom;

each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is an integer independently from 2 to 8, preferably 2, 3 or 4, and more preferably 2.

Process (B) comprises (a) reacting a silane compound of the formula (XVII):

$$H_2N-R^2-Si(R^5)_x(OR^6)_{3-x} \quad (XVII)$$

with a compound of the formula (XX):

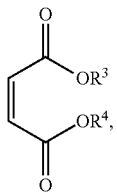

to obtain an intermediate compound of the formula (XXI):

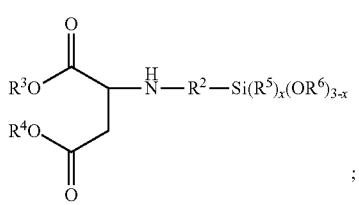

and (b) reacting the intermediate compound of the formula (XXI) from step (a), with with a compound of the formula (XVIII):

$$A^1(OH)_z \quad (XVIII)$$

to obtain the aspartic acid ester-functional polysiloxane of the formula (Ia):

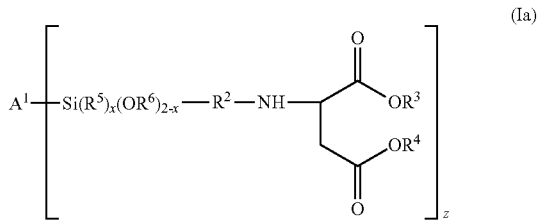

wherein $A^1$ is a polyorganosiloxanyl residue comprising at least one siloxy unit selected from the group consisting of $R^1_3SiO_{1/2}$, $R^1_2SiO_{2/2}$, $R^1SiO_{3/2}$ and $SiO_{4/2}$, wherein $R^1$ is an organic group and the polyorganosiloxanyl residue is bonded to Si via an oxygen atom, and the polyorganosiloxanyl residue $A^1$ contains at least two siloxy groups which can bond to the silicon atom;

each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is an integer independently from 2 to 8, preferably 2, 3 or 4, and more preferably 2.

Process (C) comprises (a) reacting a silane compound of the formula (XVII):

$$H_2N-R^2-Si(R^5)_x(OR^6)_{3-x} \quad (XVII)$$

with water to obtain an intermediate compound of the formula (XXII):

$$[H_2N-R^2-Si(R^5)_x(OR^6)_{2-x}]_2 O; \quad (XXII)$$

and (b) reacting the intermediate compound of the formula (XXII) in step (b) with a compound of the formula (XX):

to obtain a compound of the formula (I):

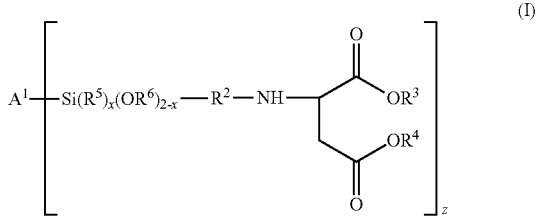

wherein

A is oxygen;

each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is an integer 2.

Process (D) comprises (a) reacting a silane compound of the formula (XXI):

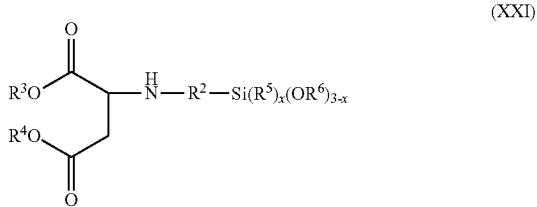

with water to obtain a compound of the formula (I):

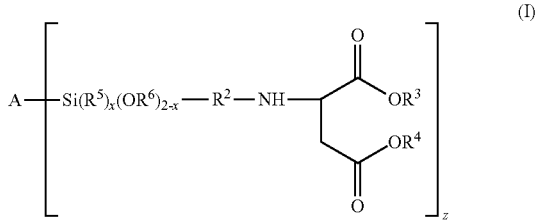

wherein

A is oxygen;

each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is an integer 2.

In a preferred embodiment, the process (A) or process (B) used hydroxyl-containing polysiloxane compound $A^1(OH)_z$ of the formula (XVIII), where z is 2, and having the formula (XXIII):

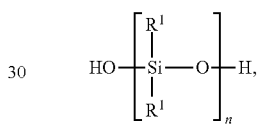

wherein $R^1$ is independently selected from organic groups, preferably $R^1$ is selected from aliphatic or aromatic groups, preferably selected from an n-alkyl, iso-alkyl, or tertiary alkyl having up to 30 carbon atoms, an alkoxyalkyl having up to 30 carbon atoms, cycloalkyl having from 5 to 30 carbon atoms, an aryl having from 6 to 30 carbon atoms, an alkylaryl having from 7 to 30 carbon atoms, which groups can be substituted in addition by one or more oxygen, nitrogen, sulfur and/or fluorine atoms, or poly($C_2$-$C_4$)-alkylene ethers with up to 500 alkylene oxy units, the groups $R^1$ being free of aliphatic unsaturation. Representative and non-limiting examples of suitable monovalent hydrocarbon radicals include alkyl radicals, preferably such as $CH_3$—, $CH_3CH_2$—, $(CH_3)_2CH$—, $C_8H_{17}$— and $C_{10}H_{21}$—, and cycloaliphatic radicals, such as cyclohexylethyl, aryl radicals, such as phenyl, tolyl, xylyl, aralkyl radicals, such as benzyl and 2-phenylethyl. Preferable monovalent halohydrocarbon radicals have the formula $C_nF_{2n+1}CH_2CH_2$— wherein n has a value of from 1 to 10, such as, for example, $CF_3CH_2CH_2$—, $C_4F_9CH_2CH_2$—, $C_6F_{13}CH_2CH_2$—, or halohydrocarbon radicals substituted with an oxygen, such as, for example, $C_2F_5$—O($CF_2$—$CF_2$—O)$_{1-10}CF_2$—, F[CF($CF_3$)—$CF_2$—O]$_{1-5}$—($CF_2$)$_{0-2}$—, $C_3F_7$—OCF($CF_3$)— and $C_3F_7$—OCF($CF_3$)—$CF_2$—OCF($CF_3$)— and n is an integer from 1 to 2000, preferably 2 to 2000, more preferably 0 to 100, still more preferably 0 to 10.

Preferred silanes which can be used in processes A, B or C are 4-amino-3,3-dimethylbutyltrimethoxysilane, which is commercially available under the trade designation Silquest* A-1637 silane from Momentive Performance Materials and 4-amino-3,3-dimethylbutylmethyldimethoxysilane, Hydroxyl-containing polyorganosiloxanes are commercially available. Suitable silanol-functional polysiloxanes include, but are not limited to, Silres SY 300, Silres SY 440, Silres MK and REN 168 from Wacker Silicone, DC-840, DC233, DG431 HS and DC-Z-6018 from Dow Chemical and Rhodorsil Resin 6407 and 6482 from Rhodia Silicones.

Maleic acid esters are commercially available and include for example the dimethyl maleate, diethyl maleate, di-n-butyl maleate, di-sec-butyl, maleate, di-tert-butyl maleate), diamyl maleate, di-2-ethylhexyl maleate esters and mixed esters based on mixtures of the above and/or other alkyl groups. The dimethyl, diethyl maleate and dibutyl maleate are preferred, while the diethyl maleate esters are especially preferred.

In one embodiment, fumarate esters can be used in place of the maleate esters, because these esters will isomerize in the presence of amine to a mixture of fumarate esters and maleate esters.

The reaction of the maleic acid ester compounds and the amino functional compounds may be carried out, for example, at a temperature of from 0 to 150° C. using the starting materials in such proportions that at least 1, preferably 1, olefinic double bond is present for each primary amino group. Excess of starting materials may be removed by distillation after the reaction. The reaction may be carried out absence or in the presence of suitable organic solvents such as alcohols, ethers, acetates and ketones, preferably methanol, ethanol, propanol, n-butyl acetate, butylglycol, methylethylketone, dioxane, and mixtures of such organic solvents. Preferred solvents are those which are not reactive with isocyanates.

While the above description contains many specifics, these specifics should not be construed as limitations on the scope of the invention, but merely as exemplifications of preferred embodiments thereof. Those skilled in the art may envision many other possible variations that are within the scope and spirit of the invention as defined by the claims and preferred embodiments appended hereto.

PREFERRED EMBODIMENTS OF THE INVENTION

Embodiment 1

A compound of the formula (I):

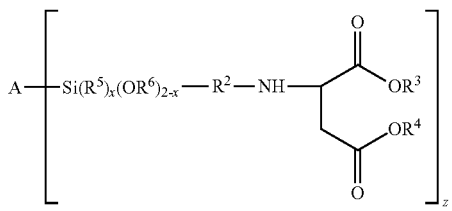

(I)

wherein

A is oxygen (—O—) or a polyorganosiloxanyl residue comprising at least one siloxy unit selected from the group consisting of $R^1{}_3SiO_2$, $R^1{}_2SiO_{2/2}$, $R^1SiO_{3/2}$ and $SiO_{4/2}$, wherein $R^1$ is an organic group and the polyorganosiloxanyl residue is bonded to Si via an oxygen atom, with the provisos that (i) if A is oxygen (—O—), then z is 2, and (ii) if A is a polyorganosiloxanyl residue, then the polyorganosiloxanyl residue contains at least two siloxy groups which can bond to the silicon atom;

each $R^2$ is independently selected from the group consisting of a straight chain alkylene group having from 1 to 10 carbon atoms, branched chain alkylene group having from 3 to 10 carbon atoms, a cycloalkylene group having from 3 to 10 carbon atom, an arylene group having from 6 to 12 carbon atoms, an aralkylene group having from 7 to 10 carbon atoms and an arenylene group having from 7 to 10 carbon atom, preferably methylene, propylene, 2-methyl-butylene and 2,2-dimethylbutylene and more preferable a branched chain alkylene group having from 3 to 10 carbon atoms, such as 2,2-dimethylbutylene bound in particular to the Si and N atoms as shown schematically below:

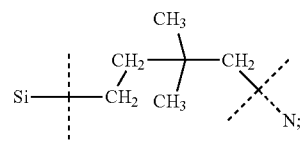

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is an integer independently from 2 to 8, preferably 2, 3 or 4, and more preferably 2.

2. A compound of embodiment 1, wherein A is a polyorganosiloxanyl residue comprising from 1 to 2000, preferably 2 to 2000 siloxy units.

3. A compound according to any of embodiments 1 or 2, wherein A is a linear or branched polyorganosiloxanyl residue.

4. A compound according to any of embodiments 1 to 3 wherein A is a group of the formula (IV):

(IV)

wherein the subscript n is an integer in the range from 0 to 2000, preferably 1 to 2000, more preferably 2 to 2000, still more preferably 0 to 100, still more preferably 0 to 50, still more preferably 1 to 100, still more preferably 1 to 50; and $R^1$ is independently organic groups, preferably selected from aliphatic or aromatic groups, more preferably selected from an n-alkyl, iso-alkyl, or tertiary alkyl having up to 30 carbon atoms, an alkoxyalkyl having up to 30 carbon atoms, cycloalkyl having from 5 to 30 carbon atoms, an aryl having from 6 to 30 carbon atoms, an alkylaryl having from 7 to 30 carbon atoms, which groups can be substituted in addition by one or more oxygen, nitrogen, sulfur and/or fluorine atoms, or poly($C_2$-$C_4$)-alkylene ethers with up to 500 alkylene oxy units, the groups $R^1$ being free of aliphatic unsaturation.

5. A compound according to embodiment 4, where $R^1$ is a monovalent hydrocarbon radical including alkyl radicals, preferably such as $CH_3$—, $CH_3CH_2$—, $(CH_3)_2CH$—, $C_8H_{17}$— and $C_{10}H_{21}$—, cycloaliphatic radicals including cyclohexylethyl, aryl radicals including phenyl, tolyl, xylyl, aralkyl radicals including benzyl and 2-phenylethyl, monovalent halohydrocarbon radicals have the formula $C_mF_{2m+1}CH_2CH_2$— wherein m has a value of from 1 to 10, including $CF_3CH_2CH_2$—, $C_4F_9CH_2CH_2$—, $C_6F_{13}CH_2CH_2$—, or halohydrocarbon radicals substituted with an oxygen including $C_2F_5$—$O(CF_2$—$CF_2$—$O)_{1\text{-}10}CF_2$—, $F[CF(CF_3)$—$CF_2$—$O]_{1\text{-}5}$—$(CF_2)_{0\text{-}2}$—, $C_3F_7$—$OCF(CF_3)$— and $C_3F_7$—$OCF(CF_3)$—$CF_2$—$OCF(CF_3)$—.

6. A compound according to any of embodiments 4 and 5, wherein $R^1$ is a methyl or phenyl.

7. A compound according to any of embodiments 1 to 6, wherein A is a polysiloxane residue having the formula (V):

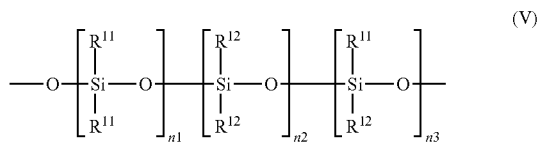

(V)

in which the units are arranged blockwise or randomly and in any order, and wherein $R^{11}$ is a monovalent aliphatic group, preferably an alkyl group of from 1 to 4 carbon atoms, more preferably methyl;

$R^{12}$ is a monovalent aromatic group, preferably an aryl group of from 6 to 12 carbon atoms, more preferably phenyl;

the subscripts n1, n2 and n3 are integers independently ranging from n1=0 to 2000, preferably 1 to 2000, more preferably 2 to 2000 and still more preferably 2 to 50;

n2=0 to 2000, preferably 1 to 2000, more preferably 2 to 2000 and still more preferably 0 to 50; and n3=0 to 2000, preferably 1 to 2000, more preferably 2 to 2000 and still more preferably 0 to 50; with the proviso that n1+n2+n3=n, where n is 1 to 2000.

8. A compound according to embodiment 7, wherein $R^1$ is a methyl group and $R^{12}$ is a phenyl group.

9. A compound of embodiment 8, wherein the molar ratio n1:(n2+n3) is in the range of 100:1 to 1:10.

10. A compound of any of embodiments 7 to 9, wherein n1 is from 1 to 100, n2 is from 1 to 100 and n3 is 0.

11. A compound according to any of the embodiments 1 to 10, which is selected from the group consisting of the formulas (VII) and (VIII):

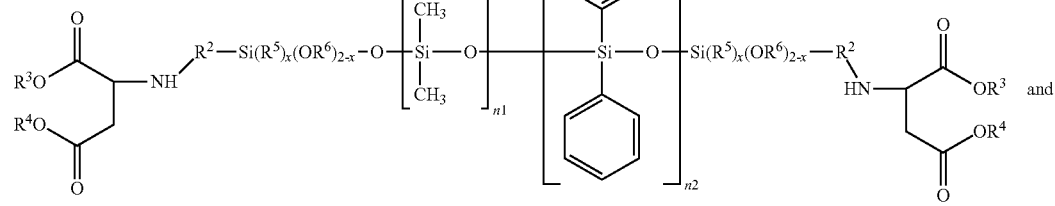

(VII)

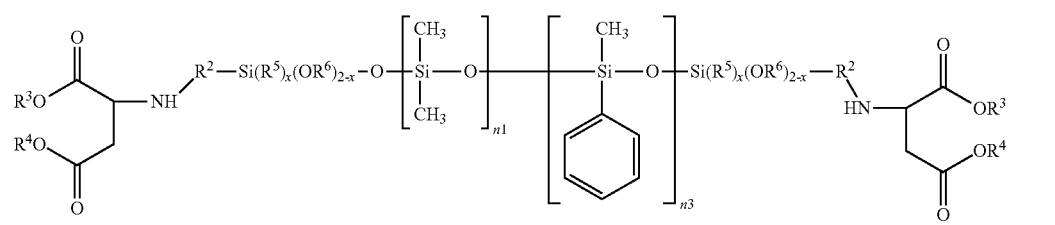

(VIII)

wherein $R^2$ is independently a divalent straight chain alkylene group having from 1 to 10 carbon atoms or a branched chain alkylene group having from 3 to 10 carbon atoms, preferably methylene, propylene, 2-methylpropylene and 2,2-dimethylbutylene and more preferably preferable a branched chain alkylene group having from 3 to 10 carbon atoms, such as 2,2-dimethylbutylene;

$R^3$ and $R^4$ are independently selected from the group consisting of alkyl having from 1 to 4 carbon atoms, preferably methyl or ethyl and most preferably ethyl; and $R^5$ and $R^6$ are independently an alkyl group and more preferably methyl or ethyl, n1 is 1 to 1000, n2 is 1 to 1000 and n3 is 1 to 1000, preferably n1 is 2 to 100, n2 is 2 to 100, and n3 is 2 to 100, with the proviso that n1+n2=n, and n1+n3=n, where n is 2 to 2000, and wherein the dimethylsiloxy, diphenylsiloxy and methylphenylsiloxy groups can be arranged in any order.

12. A compound according to any of embodiments 1 to 11, wherein $R^2$ is 2,2-dimethylbutylene bound in particular to the Si and N atoms as shown schematically below:

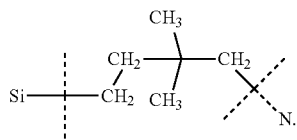

13. Use of a compound according to any of embodiments 1 to 12 for the manufacture of crosslinkable compositions.

14. Use of a compound according to embodiment 13 for the manufacture of crosslinkable compositions comprising polyisocyanates.

15. Curable compositions comprising at least one compound according to any of embodiments 1 to 12.

16. Curable compositions according to embodiment 15, comprising:
   A) at least one aspartic acid ester-functional polysiloxane according to any of embodiments 1 to 12,
   B) at least one polyisocyanate, and
   C) optionally one or more isocyanate-reactive compounds different from component A.

17. Curable compositions according to embodiment 16, wherein the one or more isocyanate-reactive compounds C) different from component A) are selected from the group consisting of polyols, polythiols and polyamines, preferably polyols and polyamines.

18. Cured compositions obtained by curing the curable compositions according to any of embodiments 15 to 17.

19. Use of the curable compositions according to any of the embodiments 15 to 17 for the manufacture of paints, coatings, adhesives, foams, encapsulants, including polyurethane vacuum casting resins, polyurethane quick cast resins, elastomer curing PU cast resins, electrical potting compounds, edge casting compounds; polyurethane articles including mattresses, shoe soles, gaskets, hoses, floors, insulating materials, paints, adhesives, sealants, skis, car seats, running tracks in stadiums, dashboards, casting compounds, latex-free condoms and cast floors.

20. Articles comprising the cured compositions according to embodiment 19.

21. A coating composition comprising at least one compound according to any of embodiments 1 to 12.

22. A coating obtained by curing the curable compositions according to any of embodiments 15 to 17.

23. Composite articles, comprising at least one substrate having on at least a part of the surface thereof a cured composition according to embodiment 18 or a coating of embodiment 22.

24. Composite article, according to embodiment 23, wherein the substrate is selected from the group, consisting of metal, plastic, concrete and wood.

25. A process for the manufacture of the compounds according to any of embodiments 1 to 12, said process selected from the group consisting of processes (A) to (C), wherein:

Process (A) comprises
(a) reacting a silane compound of the formula (XVII):

$$H_2N-R^2-Si(R^5)_x(OR^6)_{3-x} \quad (XVII)$$

with a compound of the formula (XVIII):

$$A^1(OH)_z \quad (XVIII)$$

to obtain an intermediate compound of the formula (XIX):

$$A^1[-Si(R^5)_x(OR^6)_{2-x}-R^2-NH_2]_z \quad (XIX); \text{ and}$$

(b) reacting the intermediate compound of step (a) with a compound of the formula (XX):

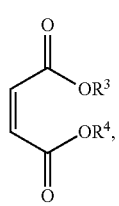

(XX)

to obtain the aspartic ester-functional polysiloxane of the formula (Ia):

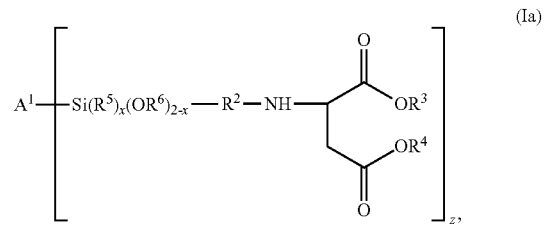

(Ia)

wherein $A^1$ is a polyorganosiloxanyl residue comprising at least one siloxy unit selected from the group consisting of $R^1_3SiO_{1/2}$, $R^1_2SiO_{2/2}$, $R^1SiO_{3/2}$ and $SiO_{4/2}$, wherein $R^1$ is an organic group and the polyorganosiloxanyl residue is bonded to Si via an oxygen atom, and the polyorganosiloxanyl residue $A^1$ contains at least two siloxy groups which can bond to the silicon atom;

each $R^2$ is independently selected from the group consisting of a straight chain alkyl group having from 1 to 10 carbon atoms, a branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is an integer independently from 2 to 8, preferably 2, 3 or 4, and more preferably 2.

Process (B)
(a) reacting a silane compound of the formula (XVII):

$$H_2N-R^2-Si(R^5)_x(OR^6)_{3-x} \quad (XVII)$$

with a compound of the formula (XX):

(XX)

to obtain an intermediate compound of the formula (XXI):

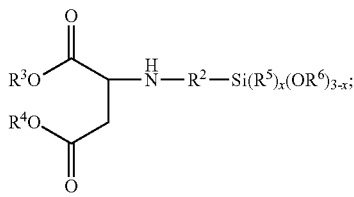

and
(b) reacting the intermediate compound of the formula (XXI) from step (a), with a hydroxyl-containing polysiloxane compound of the formula (XVIII):

$A^1(OH)_z$                                (XVIII)

to obtain the aspartic ester-functional polysiloxane of the formula (Ia):

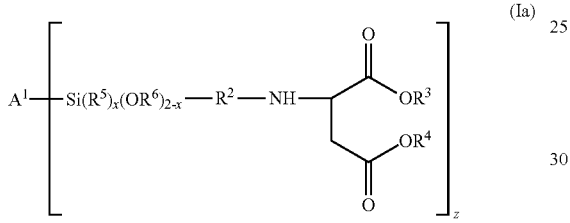

wherein $A^1$ is a polyorganosiloxanyl residue comprising at least one siloxy unit selected from the group consisting of $R^1_3SiO_{1/2}$, $R^1_2SiO_{2/2}$, $R^1SiO_{3/2}$ and $SiO_{4/2}$, wherein $R^1$ is an organic group and the polyorganosiloxanyl residue is bonded to Si via an oxygen atom, and the polyorganosiloxanyl residue $A^1$ contains at least two siloxy groups which can bond to the silicon atom;

each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atoms, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is an integer independently from 2 to 8, preferably 2, 3 or 4, and more preferably 2, and Process (C) comprises
(a) reacting a silane compound of the formula (XVII):

$H_2N-R^2-Si(R^5)_x(OR^6)_{3-x}$          (XVII)

with water to obtain an intermediate compound of the formula (XXII):

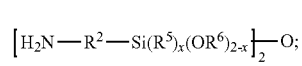

and
(b) reacting the intermediate compound of the formula (XXII) in step (b) with a compound of the formula (XX):

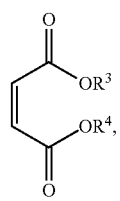

to obtain a compound of the formula (I):

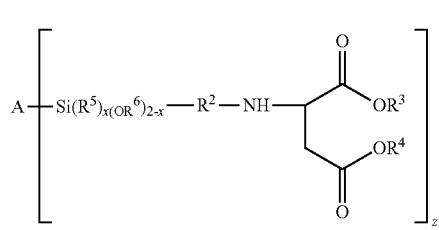

wherein

A is oxygen;

each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is 2,

Process (D) comprises (a) reacting a silane compound of the formula (XXI):

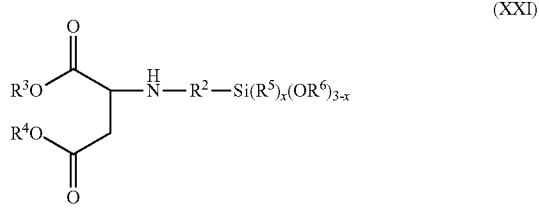

with water to obtain a compound of the formula (I):

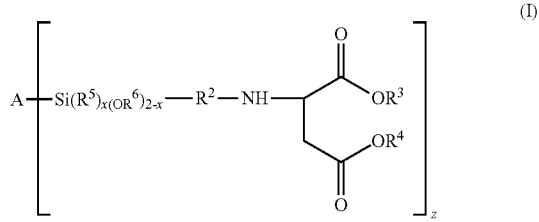

wherein

A is oxygen;

each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom, preferably methylene, propylene, 2-methylbutylene and 2,2-dimethylbutylene and more preferable 2,2-dimethylbutylene;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1, preferably x is 0; and z is 2.

The present invention will be explained in more detail by the following examples.

EXAMPLES

Example 1. Synthesis of Aspartic Acid Ester-Functional Polysiloxane (AEAFP-1)

4-Amino-3,3-dimethylbutyltrimethoxysilane (256 grams, 1.15 mole) was charged in a 1000-ml four neck flask, equipped with a stirrer, condenser, thermometer and a dropping funnel. Hydroxy-terminated polydimethylsiloxane (260 grams with an OH content of 4.4 mmole/gram or 1.15 mole of OH) was added to the aminosilane from the dropping funnel over 30 minutes, starting at room temperature. During the feeding the temperature increased up to 31° C. After the feeding, the mixture was heated up to 70° C. and held for 2 hours at 70° C. After that, the formed methanol was stripped out at 150° C., 20 mbar. Yield: 450 grams of a low viscous amino-functional siloxane with an amine content of 2.4 mmole N/gram, determined by titration with 1 molar hydrochloric acid. The following structure of the product (AFP-1) was confirmed by the $^1$H and $^{29}$Si NMR analyses.

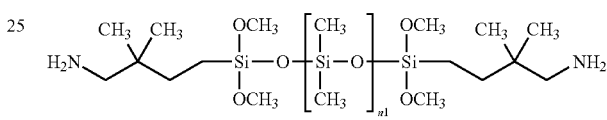

wherein n1 is about 4 to about 8.

Amino-functional polysiloxane (AFP-1) (1000 grams corresponding to 2.4 moles of amino groups) was charged in a 2000 ml four neck flask, equipped with stirrer, condenser, thermometer and dropping funnel. Diethyl maleate (409 grams, 2.4 moles) was added dropwise from the dropping funnel to the above amino-functional polysiloxane during a 4 hours period maintaining the reaction temperature at 20-30° C. Afterwards, the temperature of the flask was increased to 80° C. and the reaction mixture was maintained at this temperature for 4 hours. Finally, the reaction mixture was cooled to room temperature and used in further experiments without further purification. The following structure of the product (AEAFP-1) was confirmed by the $^1$H and $^{29}$Si NMR analyses.

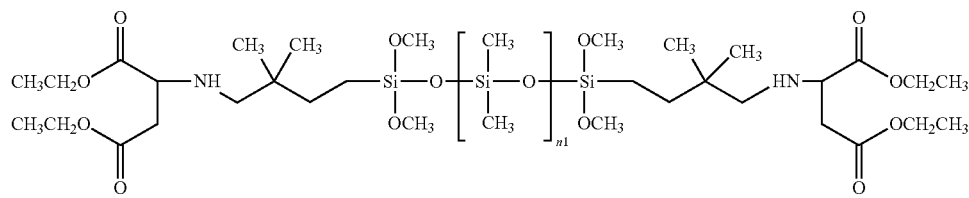

wherein n1 is about 4 to about 8.

Example 2. Synthesis of Aspartic Acid Ester-Functional Polysiloxane (AEAFP-2)

3-Aminopropyltriethoxysilane (221 grams, 1 mole, obtained from Momentive under the trade designation Silquest* A-1100 silane) was charged into a 1000 ml four neck flask, equipped with stirrer, condenser, thermometer and dropping funnel. Over the dropping funnel 260 grams of a hydroxy-terminated polydimethysiloxane with an OH content of 4.4 mmole/gram or 1.15 mole OH were added to the above aminosilane over 30 minutes, starting at room temperature. During the feeding the temperature increased up to 31° C. After the feeding, the mixture was heated up to 70° C. and held for 2 hours at 70° C. After that, the formed ethanol was stripped out at 150° C., 20 mbar. Yield: 450 grams of a low viscous amino-functional polysiloxane (AFP-2) with an amine content of 2.5 mmole N/gram, determined by titration with 1 molar hydrochloric acid. The following structure of the product (AFP-2) was confirmed by the $^1$H and $^{29}$Si NMR analyses.

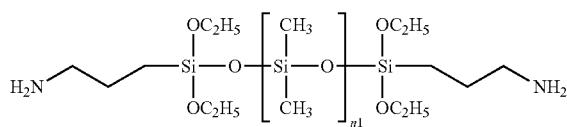

wherein n1 is about 4 to about 8.

Amino-functional polysiloxane AFP-2 (610 grams, 2 moles of amino groups) was charged in a 2000 ml four neck flask, equipped with stirrer, condenser, thermometer and dropping funnel. Diethyl maleate (340 grams, 2 moles) was added dropwise from the dropping funnel to the amino-functional polysiloxane AFP-2 during a 4-hour period maintaining a reaction temperature at 20-30° C. Afterwards, the temperature of the flask was increased to 80° C. and the reaction mixture was maintained at this temperature for 4 hours. Finally, the reaction mixture was cooled down and used in further experiments without further purification. The following structure of the product (AEAFP-2) was confirmed by the $^1$H and $^{29}$Si NMR analyses.

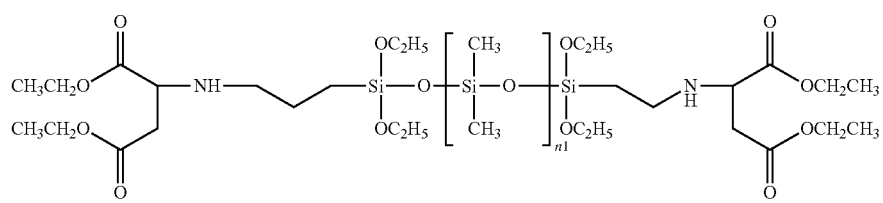

wherein n1 is about 4 to about 8.

Comparative Example I. Synthesis of Acrylic Acid Ester-Functional Polysiloxane (AEAFP-3)

Amino-functional polysiloxane AFP-1 (1000 grams, 2.4 moles of amino groups) from Example 1 was charged in a 2000 ml four neck flask, equipped with a stirrer, condenser, thermometer and a dropping funnel. Methyl acrylate (205 grams, 2.4 moles) was added dropwise from the dropping funnel to the amino-functional polysiloxane 1 during 4-hour period maintaining reaction temperature at 20-30° C. Afterwards, the reaction mixture was kept at room temperature overnight. Afterwards, temperature of the flask was increased to 80° C. and the reaction mixture was maintained at this temperature for 4 hours. Finally, the reaction mixture was cooled down and used in further experiments without further purification. The following structure of the product (AEAFP-3) was confirmed by the $^1$H and $^{29}$Si NMR analyses.

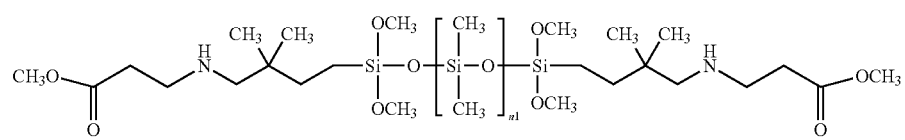

wherein n1 is about 4 to about 8.

Example 3. Synthesis of Aspartic Acid Ester-Functional Polysiloxane (AEAFP-4)

4-Amino-3,3-dimethylbutyltrimethoxysilane (255 grams, 1.15 moles) and hydroxy-terminated mixed dimethyl-diphenyl polysiloxane (681 grams, with an OH content of 1.5 mmole/gram or 1.0 mol OH) were charged into a 2000 ml three neck flask, equipped with a stirrer, condenser and a thermometer. The mixture was heated up to 70° C. and held for 2 hours at 70° C. After that, the formed methanol was stripped out at 150° C., 20 mbar. The remaining material was filtered using a Seitz deep filter (Supra®300) with 1% Cellulose (Vitacel® L20) as filter aid. Yield: 700 grams of a medium viscous amino-functional polysiloxane (AFP-4) with an amine content of 0.92 mmole N/gram, determined by titration with 1 molar hydrochloric acid). The following structure of the product AFP-4 was confirmed by the $^1$H and $^{29}$Si NMR analyses.

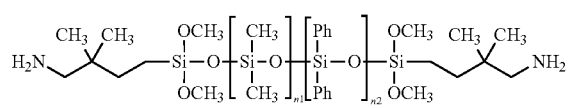

wherein the dimethylsiloxy and the diphenylsiloxy units are arranged randomly, and n1 is from about 5 to about 10 and n2 is from about 2 to about 6.

Amino-functional polysiloxane AFP-4 (500 grams, 0.5 mole of amino groups) was charged in a 2000 ml four neck flask, equipped with stirrer, condenser, thermometer and dropping funnel. Diethyl maleate (80-grams, 0.5 mole) was added dropwise from the dropping funnel to the above amino-functional polysiloxane during 4-hour period maintaining reaction temperature at 20-30° C. Afterwards, the temperature of the flask was increased to 80° C. and the reaction mixture was maintained at this temperature for 4 hours. Finally, the reaction mixture was cooled to room temperature and used in further experiments without further purification. Structure of the product was confirmed by the $^1$H and $^{29}$Si NMR analyses.

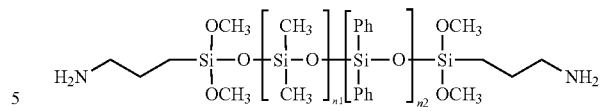

wherein the dimethylsiloxy and the diphenylsiloxy units are arranged randomly, and n1 is from about 5 to about 10 and n2 is from about 2 to about 6.

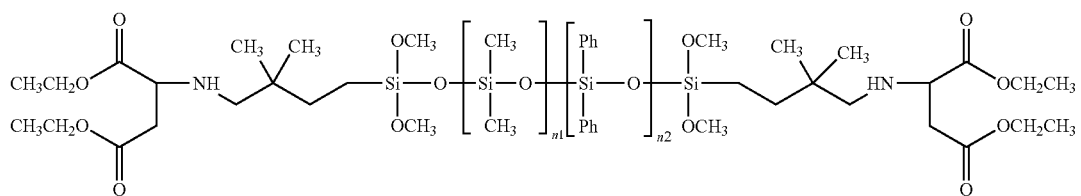

wherein the dimethylsiloxy and the diphenylsiloxy units are arranged randomly, and n1 is about 5 to about 10 and n2 is about 2 to about 6.

Example 4. Synthesis of the Aspartic Acid Ester-Functional Polysiloxane (AEAFP-5)

3-Aminopropyltrimethoxysilane (206.2 grams, 1.15 mole, obtained from Momentive under the trade designation Silquest* A-1110 silane) and hydroxy-terminated mixed dimethyl-diphenyl polysiloxane (681 grams, with an OH content of 1.5 mmole/gram or 1.0 mol OH) were charged into a 2000 ml three neck flask, equipped with a stirrer, condenser and a thermometer. The mixture was heated up to 70° C. and held for 2 hours at 70° C. After that, the formed methanol was stripped out at 150° C., 20 mbar. The remaining material was filtered using a Seitz deep filter (Supra®300) with 1% Cellulose (Vitacel® L20) as filter aid. Yield: 700 grams of a medium viscous amino-functional polysiloxane (AFP-5) with an amine content of 1.06 mmole N/gram, determined by titration with 1 molar hydrochloric acid). The following structure of the product AFP-5 was confirmed by the $^1$H and $^{29}$Si NMR analyses.

Amino-functional polysiloxane AFP-5 (500 grams, 0.53 mole of amino groups) was charged in a 2000-ml four neck flask, equipped with stirrer, condenser, thermometer and dropping funnel. Diethyl maleate (91.3 grams, 0.53 mole) was added dropwise from the dropping funnel to the amino-functional polysiloxane during 4-hour period maintaining reaction temperature at 20-30° C. Afterwards, temperature of the flask was increased to 80° C. and the reaction mixture was maintained at this temperature for 4 hours. Finally, the reaction mixture was cooled to room temperature and used in further experiments without further purification. Structure of the product was confirmed by the $^1$H and $^{29}$Si NMR analyses.

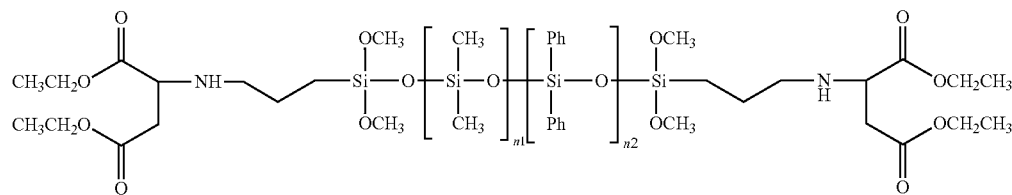

wherein the dimethylsiloxy and the diphenylsiloxy units are arranged randomly, and n1 is about 5 to about 10 and n2 is about 2 to about 6.

Example 5. Test of Pot Life

To test pot life combinations of different amino-functional polysiloxanes and aliphatic polyisocyanate Desmodur N3390 were investigated. In the experiment pot life was characterized as total time required for complete gelation of the mixture after mixing of both components. Amounts of material mixed in the experiment are given in the brackets (10 grams) and (1 gram) in the table below. Gelation was checked visually as a point where the mixture was no longer stirrable, The results of the investigation are summarized in Table 1.

TABLE 1

Pot life of different amino functional polysiloxane/polyisocyanate mixtures

| Aminofunctional polysiloxane | Polyisocyanate | Pot life (in sec.) | Appearance: |
|---|---|---|---|
| acrylic acid ester-functional polysiloxane AEAPF-3 (comparative) AEAFP-3 (10 gms) | Desmodur ® 3390 (1 g) | 0, immediate gelation | matt gel |
| aspartic acid ester-functional polysiloxane (inventive) AEAFP-2 (10 gms) | Desmodur ® 3390 (1 g) | 30 | slightly turbid |
| aspartic acid ester-functional polysiloxane (inventive) AEAFP-1 (10 gms) | Desmodur ® 3390 (1 g) | 1800 | clear |
| aspartic acid ester-functional phenyl-methyl polysiloxane (inventive) AEAFP-4 (10 gms) | Desmodur ® 3390 (1 g) | 2100 | Slightly turbid |
| aspartic acid ester-functional phenyl-methyl polysiloxane (inventive) AEAFP-5 (10 gms) | Desmodur ® 3390 (1 g) | 240 | Slightly turbid |

The experimental results from Example 5 demonstrate that aspartic acid ester-functional polysiloxanes can be used for the formulation of two-component systems with polyisocyanates. Such systems will cure at ambient temperatures. In addition, incorporation of sterically hindered aminosilane in the structure of the polysiloxane or incorporation of sterically bulky phenyl groups in the structure of polysiloxane will allow extending pot life of the curing composition.

Examples 6 and 7 and Comparative Example II.
Investigation of Mechanical and Physical Properties To test the effect of the aspartic acid ester modified amino-functional polysiloxanes on the mechanical and physical properties of polyurea composites, several two-component polyamine-polyisocyanate mixtures were prepared and analyzed. The results of the investigation are summarized in Table 2

TABLE 2

Mechanical properties of different polyamine/polyisocyanate mixtures (formulations are given in gram)

| Component | Comparative Example II | Example 6 | Example 7 |
|---|---|---|---|
| Desmophen ® NH1520[2] | 333 | 267 | |
| Aspartic acid ester-functional polydimethylsiloxane AEAFP-1 | | 144 | 720 |
| Desmodur ® N3900[1] | 218 | 218 | 218 |

TABLE 2-continued

Mechanical properties of different polyamine/polyisocyanate mixtures (formulations are given in gram)

| Component | Comparative Example II | Example 6 | Example 7 |
|---|---|---|---|
| Test methods in accordance with DIN 53504, DIN ISO 7619 | | | |
| Tensile strength (MPa) | 40 | 22 | 3 |
| Elongation at break (%) | 13.6 | 21.5 | 60.1 |
| S-Hardness (A) | n.a. too hard | 97 | 66 |

[1]aliphatic polyisocyanate
[2]polyaspartic resin from Covestro

The experimental results of Examples 6 and 7 demonstrate that aspartic acid ester-functional polysiloxanes improves elasticity of polyurea compositions when compared to Comparative Example II using a non siloxane based polyaspartic resin.

Example 8 and Comparative Example III.
Investigation of Aspartic Acid Ester Modified Amino-Functional Polysiloxane in Two-Component Polyurea Direct-to-Metal Topcoat System Formulation of Polyurea Coating Systems The formulation of different polyamine direct-to-metal topcoat systems was carried out in accordance with the general recipe summarized in the table 3. For this, positions 1-4 were gently charged into the double-jacket mixing vessel equipped with cowles blade dispersion mixer under agitation at 300 rpm. After the charging the pigment mixture was dispersed at 1500 rpm for 45 minutes. During the mixing and the dispersing process the mixing vessel was cooled down to 35-55° C. The resulting titanium dioxide dispersion was collected in 1-liter plastic container (Part A1). Positions 5-15 were gently charged into the double-jacket mixing vessel equipped with cowles blade dispersion mixer under agitation at 300 rpm. After charging the mixture was dispersed at 500 rpm for 30 minutes. Afterwards the resulting pre-mix was charged with 1 kilogram of Zr-beads (Ø1.2-1.4 mm) and grinded at 1500 rpm for 45 minutes. During the mixing and the grinding process the mixing vessel was cooled down to 35-55° C. After the process was completed the liquid phase of the resulting mixture was separated from the Zr-beads and the resulting resin binder (Part A2) was collected in 1-liter plastic container. Preparation of the topcoat part of the formulation was carried out by mixing titanium dioxide dispersion (Part A1 of the formulation) with the functional resin binder (Part A2 of the formulation). The resulting white topcoat was stirred for 2 hours at 150-300 rpm, carefully collected and stored until further use. Separately from the white topcoat, positions 17-19 were mixed under nitrogen by agitation in the 3-neck glass flask equipped with mechanical stirrer and nitrogen inlet. The resulting polyisocyanate crosslinker (Part B) was stored under nitrogen in a dark and dry place until further use.

TABLE 3

Formulation of different two-component polyurea direct-to-metal coating systems (in grams)

| | Component | Comparative Example III | Example 8 |
|---|---|---|---|
| | PART A1 | | |
| Pos. 1 | Desmophen ® NH1520[2] | 129.5 | 129.5 |
| Pos. 2 | Butyl acetate | 35.6 | 35.6 |
| Pos. 3 | Xylene | 20.4 | 20.4 |
| Pos. 4 | Huntsman ® R-KB-4 (Titanium Dioxide) | 178.2 | 178.2 |
| | PART A2 | | |
| Pos. 5 | Desmophen ® NH1520[2] | 203.6 | 101.8 |
| Pos. 6 | Aspartic acid ester-functional polydimethylsiloxane AEAFP-1 | | 101.8 |
| Pos. 7 | Butyl acetate | 12.7 | 12.7 |
| Pos. 8 | Xylene | 12.7 | 12.7 |
| Pos. 9 | Ethyl-3-ethoxypropionate | 12.7 | 12.7 |
| Pos. 10 | Dowanol ® PGDA (Propylene glycol diacetate) | 12.7 | 12.7 |
| Pos. 11 | Heucophos ® CAPP (Calcium phosphate) | 43.6 | 43.6 |
| Pos. 12 | Tremin ® 283-100 EST (Wollastonite) | 30.9 | 30.9 |
| Pos. 13 | Blanc fixe ® F (BaSO$_4$) | 29.1 | 29.1 |
| Pos. 14 | CoatOSil ® 7001 (polysiloxane-polyether block copolymer) | 1.8 | 1.8 |
| Pos. 15 | Tinuvin ® 292 (UV-HALS (hindered amine light stabilizer) | 3.6 | 3.6 |
| | PART B | | |
| Pos. 17 | Desmodur ® 3900[1] | 218.2 | 218.2 |
| Pos. 18 | Butylglycol acetate | 40.9 | 40.9 |
| Pos. 19 | Ethyl-3-ethoxypropionate | 13.6 | 13.6 |

[1] aliphatic polyisocyanate
[2] polyaspartic resin from Covestro

Preparation and Application of Two-Component Polyurea Coatings

Preparation of test coating systems was carried out by mixing parts A1, A2 and B of the formulations (table 3) for 5 minutes under agitation with a mechanical stirrer at 150-300 rpm. After mixing the resulting paint systems were transferred into the pneumatic, conventional, manual, gravity feed spray-gun, equipped with a 1.6 mm spray nozzle. Spray pressure was adjusted to 2.0-2.5 bar. Wet film builds of the coating systems were controlled with the lab wet film gauge. The topcoat systems were sprayed over cold rolled steel substrate panels (Gardobond®OC). Before spraying, the test panels (substrates) were cleaned using the paper cloth immersed in xylene and then using paper cloth immersed in isopropyl alcohol. After spraying liquid coating films were dried by flash-off at room temperature for 15 minutes followed by 30 minutes bake at 65° C. in the laboratory oven. Total dry film thickness of the coated test samples was in the range of 65 to 75 microns.

Investigation of Mechanical Properties and Chemical Resistance of the Above Coatings Evaluation of mechanical, chemical and physical properties of the experimental coating systems was conducted using the following test methods and procedures: (i) Cross-hatch adhesion in accordance with DIN EN ISO 2409 2409 (Ranking is as follows. Gt0: the cutted edges are completely smooth, no partly delamination; Gt1: at the point of cross cuttings no fragments are seen, delamination area ca. 5%: Gt2: the coating is delaminated along the cutting lines or/and the cross sections, delaminated areas are about 15% of the cuttings; Gt3: the coating is delaminated partially or all along the cutting lines partially in full stripes, delaminated area is about 35%; Gt4: the coating is delaminated in full stripes and/or totally in segments, delaminated area is about 35%); (ii) Cylindrical mandrel bending test in accordance with DIN EN ISO 6860; (iii) Direct and reverse impact test with in accordance with DIN EN ISO 6272; (iv) Chemical resistance test was carried out using 0.5 M solution of sulfuric acid. In the test experimental coating film was exposed to 30, 60 and 90 minutes etching by the sulfuric acid solution (one droplet) at 50° C. After exposure the droplet was removed, the test surface was rinsed with demineralized water and inspected for defects. The test rating score, awarded as a result of performance was classified as follows: R10—no visible etching marks; R9—small marks, no relief to feel with fingertip; R8—marks, relief to feel; R6—marks, matt white shiny spots (hazy); R4—starting deterioration, white spots, clear damage to the coating; R2—blister raise; R0—coating delamination. The final rating score was calculated as an aggregate ΣR obtained at 30, 60 and 90 min. Results of the investigation of experimental test coatings from Comparative Example III and Example 8 are summarized in Table 4 and FIG. 1.

TABLE 4

Mechanical properties and chemical resistance of experimental coating systems

| | Comparative Example III | Example 8 |
|---|---|---|
| Cross-hatch adhesion | GT0 | GT0 |
| Impact resistance direct (2 KG, 2 m) | failed | OK |
| Impact resistance reversed (2 KG, 2 m) | failed | OK |
| Mandrel bending | failed | OK |
| Chemical resistance 30 min | R6 | R8 |
| Chemical resistance 60 min | R0 | R6 |
| Chemical resistance 90 min | R0 | R6 |
| Chemical resistance total rating ΣR (at 30, 60 and 90 min) | ΣR6 | ΣR20 |

Comparative Example IV and Examples 9 and 10. Investigation of Aspartic Acid Ester-Functional Polysiloxane in Two-Component Polyurethane Topcoat System Formulation of Polyurethane Coating Systems Formulation of different polyurethane topcoat systems was carried out in accordance with the general recipe summarized in the table 5. For this, positions 1-4 were gently charged into the double-jacket mixing vessel equipped with cowles blade dispersion mixer under agitation at 300 rpm. After the charging the pigment mixture was dispersed at 1500 rpm for 45 minutes. During the mixing and the dispersing process the mixing vessel was cooled down to 35-55° C. The resulting titanium dioxide dispersion was collected in 1-liter plastic container (Part A1). Positions 5-12 were gently mixed in the plastic pot under agitation at 300 rpm. After charging the mixture was additionally stirred at 300 rpm for 30 minutes and the resulting resin binder (Part A2) was collected in 1-liter plastic container. Preparation of the topcoat part of the formulation was carried out by mixing titanium dioxide dispersion (Part A1 of the formulation) with the resin binder (Part A2 of the formulation). The resulting white topcoat was stirred for 2 hours at 150-300 rpm, carefully collected and stored until further use. Separately from the white topcoat, positions 13-15 were mixed under nitrogen by agitation in the 3-neck glass flask equipped with mechanical stirrer and nitrogen inlet. The resulting polyisocyanate crosslinker (Part B) was stored under nitrogen in a dark and dry place until further use.

TABLE 5

Formulation of different two-component polyurethane topcoat systems (in grams)

| | Component | Cmparative Example IV | Example 9 | Example 10 |
|---|---|---|---|---|
| | | PART A1 | | |
| Pos. 1 | Disperbyk ® 2155 Dispersing agent from BYK Chemie | 25.0 | 25.0 | 25.0 |
| Pos. 2 | Butyl acetate | 43.8 | 43.8 | 43.8 |
| Pos. 3 | Xylene | 25.0 | 25.0 | 25.0 |
| Pos. 4 | Huntsman ® R-KB-4 (Titanium dioxide) | 218.8 | 218.8 | 218.8 |
| | | PART A2 | | |
| Pos. 5 | Desmophen ® A365 (Hydroxyl-functional polyacrylate resin) | 302.1 | 272.1 | 242.1 |
| Pos. 6 | Aspartic acid ester-functional polydimethylsiloxane AEAFP-1) | — | 30 | 60 |
| Pos. 7 | Butylglycol acetate | 78.1 | 78.1 | 78.1 |
| Pos. 8 | Xylene | 78.1 | 78.1 | 78.1 |
| Pos. 9 | Ethyl-3-ethoxypropionate | 26.0 | 26.0 | 26.0 |
| Pos. 10 | Dowanol ® PGDA | 26.0 | 26.0 | 26.0 |
| Pos. 11 | CoatOSil ® 7001E | 5.2 | 5.2 | 5.2 |
| Pos. 12 | Tinuvin ® 292 | 5.2 | 5.2 | 5.2 |
| | | PART B | | |
| Pos. 13 | Desmodur ® N3900[1] | 133.3 | 133.3 | 133.3 |
| Pos. 14 | Butylglycol acetate | 25.0 | 25.0 | 25.0 |
| Pos. 15 | Ethyl-3-ethoxypropionate | 8.3 | 8.3 | 8.3 |

[1] aliphatic polyisocyanate

Preparation and Application of Two-Component Polyurethane Coatings

Preparation of test coating systems was carried out by mixing parts A1, A2 and B of the formulations (table 5) for 5 minutes under agitation with a mechanical stirrer at 150-300 rpm. After mixing the resulting paint systems were transferred into the pneumatic, conventional, manual, gravity feed spray-gun, equipped with a 1.6 mm spray nozzle. Spray pressure was adjusted to 2.0-2.5 bar. Wet film builds of the coating systems were controlled with the lab wet film gauge. The topcoat systems were sprayed over steel panels coated with cathodic electrodeposition primer. Before spraying, the test substrate panels were cleaned using the paper cloth immersed in isopropyl alcohol. After spraying liquid coating films were dried by flash-off at room temperature for 15 minutes followed by 30 minutes bake at 65 C in the laboratory oven. Total dry film thickness of the coated test samples was in the range of 65 to 75 microns.

Investigation of Mechanical Properties and Chemical Resistance of the Polyurethane Coatings Evaluation of mechanical, chemical and physical properties of the experimental coating systems was conducted using the same test methods as in Examples 9 and 10. Results of the investigation of experimental test coatings from Comparative Example IV and Examples 9 and 10 are summarized in Table 6.

TABLE 6

Mechanical properties and chemical resistance of experimental coating systems

| | Comparative Example IV | Example 9 | Example 10 |
|---|---|---|---|
| Cross-hatch adhesion | GT1-2 | GT0 | GT0 |
| Impact resistance direct (2 KG, 2 m) | OK | OK | OK |
| Impact resistance reversed (2 KG, 2 m) | OK | OK | OK |
| Chemical resistance 30 min | R8 | R9 | R10 |
| Chemical resistance 60 min | R0 | R4 | R8 |
| Chemical resistance 90 min | R0 | R0 | R4 |
| Chemical resistance total rating | ΣR8 | ΣRB | ΣR22 |

Examples 11 and 12. Investigation of Compatibility

Compatibility of aspartic acid ester modified polysiloxanes with polyacrylic-based clear binder was investigated by mixing either the aspartic acid ester modified polysiloxanes from Example 1 (AEAFP-1) (see blends from example 11 below) or mixing Example 3 (AEAFP-4) (see blends from example 12 below) with polyacrylic clear binder Part A2 from Comparative Example IV. The compatibility of components was evaluated visually. Results of evaluation are summarized in Table 7

TABLE 7

Compatibility of aspartic acid ester modified polysiloxanes with polyacrylic clear binder

| Loading in parts by weight | | | |
|---|---|---|---|
| polyacrylic clear binder Part A2, from Comparative Example IV | Example 11. Amounts of Aspartic acid ester-functional polydimethylsiloxane AEAFP-1 added to Part A2 | Example 12. Amounts of Aspartic acid ester-functional poly(co-dimethyl-diphenyl)siloxane AEAFP-4 added to Part A2 | Observation |
| 10 | — | — | clear solution |
| 10 | 10 | — | milky solution |
| 30 | 10 | — | milky solution |
| 35 | 5 | — | clear solution |

TABLE 7-continued

Compatibility of aspartic acid ester modified polysiloxanes with polyacrylic clear binder Loading in parts by weight

| polyacrylic clear binder Part A2, from Comparative Example IV | Example 11. Amounts of Aspartic acid ester- functional polydimethylsiloxane AEAFP-1 added to Part A2 | Example 12. Amounts of Aspartic acid ester-functional poly(co-dimethyl-diphenyl)siloxane AEAFP-4 added to Part A2 | Observation |
|---|---|---|---|
| 10 | — | 10 | milky solution |
| 30 | — | 10 | clear solution |
| 35 | — | 5 | clear solution |

Experimental results from Examples 8, 9 and 10 demonstrate that introduction of aspartic acid ester modified polysiloxanes into polyurea—(see ex. 8) or polyurethane (see Ex. 9 and 10)—based coating systems can improve flexibility, impact resistance and chemical resistance of the coating finish. In addition, experimental results from Examples 11 and 12 demonstrate that aspartic acid ester modified polysiloxanes AEAFP-4 containing phenylsiloxane groups provide better compatibility with polyacrylic-based coating systems. (clear solutions are more often obtained for the blends).

Comparative Example V. Synthesis of Non-Hydrolysable Aspartic Acid Ester-Functional Polysiloxane (AEAFP-13)

Amino-functional polysiloxane like the bisaminopropyl terminated polysiloxane from Momentive Performance Materials Inc. (CAS Number: 106214-84-0) (1000 grams corresponding to 2.12 moles of amino groups) was charged in a 2000 ml four neck flask, equipped with stirrer, condenser, thermometer and dropping funnel. Diethyl maleate (376 grams, 2.12 moles) was added dropwise from the dropping funnel to the amino-functional polysiloxane during a 4 hours period maintaining the reaction temperature at 20-30° C. Afterwards, the temperature of the flask was increased to 80° C. and the reaction mixture was maintained at this temperature for 8 hours. Finally, the reaction mixture was cooled to room temperature and used in further experiments without further purification. The following structure of the product (AEAFP-13) was confirmed by the $^1$H and $^{29}$Si NMR analyses.

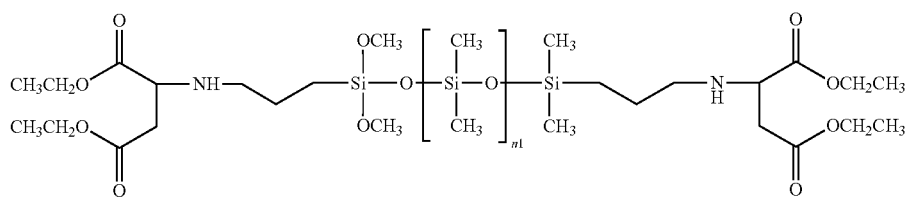

wherein n1 is about 4 to about 8.

Test of Reactivity to Form Crosslinked Film

To compare the reactivity of aspartic acid ester polysiloxanes to form crosslinked films the aspartic ester polysiloxanes of the inventive example 2 (AEAFP-2) and comparative example V (AEAFP-13) were separately mixed with 1.0 wt.-% dibutyl tin dilaurate catalyst, casted into a Petri dish and cured in the laboratory convection oven for 12 h at 60° C. Results after curing are summarized in table 8.

TABLE 8

Reactivity of various aspartic acid ester polysiloxanes to form crosslinked films

| | initial viscosity (mPa · s) | viscosity after test (mPa · s) |
|---|---|---|
| AEAFP-2 (inventive) | 26.4 | formation of transparent solid gel |
| AEAFP-13 (comparative) | 14.7 | 38.4 |

Results of the experimental test demonstrate that unlike aspartic acid ester polysiloxane AEAFP-13 containing methyl-Si (≡Si—CH$_3$) functional groups, the aspartic acid ester polysiloxane AEAFP-2, containing hydrolysable alkoxy- (≡Si—OC$_2$H$_5$) functional groups, provides significantly higher self crosslinking reactivity of the polysiloxane polymer composition.

Example 13 and Comparative Example VI.
Investigation of Aspartic Acid Ester-Functional Polysiloxanes in Two-Component Polyurea Primer Coating Systems Formulation of Polyurea Coating Systems Formulation of different polyurea primer systems was carried out in accordance with the general recipe summarized in the table 9. For this, positions 1-14 were gently charged into the double-jacket mixing vessel equipped with cowles blade dispersion mixer under agitation at 300 rpm. After the charging the mixture was dispersed at 1500 rpm for 45 minutes followed by grinding for 45 minutes with the laboratory bead mill. During the mixing, dispersing and grinding processes the mixing vessel was cooled down to 35-55° C. The resulting liquid coating system (Part A) was carefully filtered, collected and stored until further use. Separately from the primer coating system, positions 15-17 were mixed under nitrogen by agitation in the 3-neck glass flask equipped with mechanical stirrer and nitrogen inlet. The resulting polyisocyanate crosslinker (Part B) was stored under nitrogen in a dark and dry place until further use.

TABLE 9

Formulation of two-component polyurea primer systems (in grams)

| Pos. | Components | Control | Example 13: 2K polyurea primer modified with AEAFP-2 | Comparative Example VI: 2K polyurea primer modified with AEAFP-13 |
|---|---|---|---|---|
| | PART A | | | |
| Pos. 1 | Desmophene ® NH 1520[2] | 262.04 | 260.12 | 260.12 |
| Pos. 2 | Butyl acetate | 18.68 | 18.54 | 18.54 |
| Pos. 3 | Butylglycol acetate | 18.68 | 18.54 | 18.54 |
| Pos. 4 | Xylene | 18.68 | 18.54 | 18.54 |
| Pos. 5 | CoatOSil ® 7001 (polysiloxane-polyether block copolymer) | 0.22 | 0.22 | 0.22 |
| Pos. 6 | Huntsman ® R-KB-4 (Titanium dioxide) | 91.71 | 91.04 | 91.04 |
| Pos. 7 | Heucodur Schwarz 9-100 (Copper chromite) | 17.47 | 17.34 | 17.34 |
| Pos. 8 | Heucophos ® CAPP (Calcium phosphate) | 18.68 | 18.54 | 18.54 |
| Pos. 9 | Blanc fixe ® F (BaSO$_4$) | 139.75 | 138.73 | 138.73 |
| Pos. 10 | Finntalc ® M15 (Talkum) | 74.70 | 74.16 | 74.16 |
| Pos. 11 | Tremin ® 283-100 EST (Wollastonite) | 46.69 | 46.35 | 46.35 |
| Pos. 12 | Micaceous iron oxide | 28.01 | 27.81 | 27.81 |
| Pos. 13 | Aspartic acid ester functional polydimethylsiloxane (AEAFP-2) | | 7.30 | |
| Pos. 14 | Aspartic acid ester functional polydimethylsiloxane (AEAFP-13) | | | 7.30 |
| | PART B | | | |
| Pos. 15 | Desmodur ® 3390 | 211.76 | 210.22 | 210.22 |
| Pos. 16 | Butylglycol acetate | 39.71 | 39.42 | 39.42 |
| Pos. 17 | Ethyl-3-ethoxy propionate | 13.24 | 13.14 | 13.14 |

[2] polyaspartic resin from Covestro

Preparation and Application of Two-Component Polyurea Primer Coating Systems Preparation of test coating systems was carried out by mixing parts A and B of the formulations (table 9) for 5 minutes under agitation with a mechanical stirrer at 150-300 rpm. After mixing the resulting paint systems were transferred into the pneumatic, conventional, manual, gravity feed spray-gun, equipped with a 1.6 mm spray nozzle. Spray pressure was adjusted to 2.0-2.5 bar. Wet film builds of the coating systems were controlled with the lab wet film gauge. The topcoat systems were sprayed over hot dip galvanized substrate panels. Before spraying, test panels (substrates) were cleaned using the paper cloth immersed in xylene and then using paper cloth immersed in isopropyl alcohol. After spraying liquid coating films were dried for 48 h at room temperature. Total dry film thickness of the coated test samples was in the range of 35 to 45 microns.

Investigation of Corrosion Resistance of Two-Component Polyurea Primer Coating Systems Evaluation of corrosion resistance of the experimental coating systems was conducted using the neutral salt-spray procedure in accordance with DIN EN ISO 9227 test norm. Test panels were evaluated for corrosion creep at the scribe after 480 hours of exposure to the salt fog in the salt spray cabinet. Results of the neutral salt-spray investigation are summarized in table 10.

TABLE 10

Results of corrosion resistance investigation of various aspartic acid ester polysiloxanes modified polyurea primer formulations

| | Max corrosion creep at scribe |
|---|---|
| Control 2K polyurea | >10 mm, film delamination |
| Comparative Example VI, 2K polyurea primer modified with AEAFP-13 | >10 mm, film delamination |
| Example 13, 2K polyurea primer modified with AEAFP-2 | <5 |

Results of the test experiment demonstrate that unlike 2K polyurea control primer and 2K polyurea primer modified with aspartic acid ester polysiloxane AEAFP-13 (non-inventive) containing methyl- (≡Si—CH$_3$) functional groups, the 2K polyurea primer modified with aspartic acid ester polysiloxane AEAFP-2 (inventive), containing hydrolysable alkoxy- (≡Si—OC₂H₅) functional groups, provides significantly better anticorrosion properties after exposure to neutral salt spray test.

The invention claimed is:

1. A compound of the formula (I):

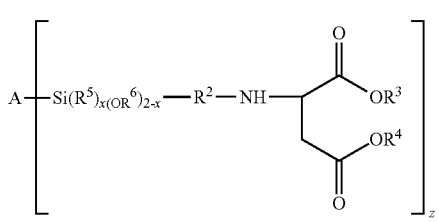

wherein

A is oxygen (—O—) or a polyorganosiloxanyl residue comprising at least one siloxy unit selected from the group consisting of $R^1{}_3SiO_{1/2}$, $R^1{}_2SiO_{2/2}$, $R^1SiO_{3/2}$ and $SiO_{4/2}$, wherein $R^1$ is an organic group and the polyorganosiloxanyl residue is bonded to Si via an oxygen atom, with the provisos that (i) if A is oxygen (—O—), then z is 2, and (ii) if A is a polyorganosiloxanyl residue, then the polyorganosiloxanyl residue contains at least two siloxy groups which can bond to the silicon atom;

each $R^2$ is independently selected from the group consisting of a straight chain alkylene group having from 1 to 10 carbon atoms, branched chain alkylene group having from 3 to 10 carbon atoms, a cycloalkylene group having from 3 to 10 carbon atom, an arylene group having from 6 to 12 carbon atoms, an aralkylene group having from 7 to 10 carbon atoms and an arenylene group having from 7 to 10 carbon atom;

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

x is an integer independently 0 or 1; and z is an integer independently from 2 to 8.

2. A compound of claim 1, wherein A is a polyorganosiloxanyl residue comprising from 1 to 2000.

3. A compound according to claim 1, wherein A is a linear or branched polyorganosiloxanyl residue of the formula (IV):

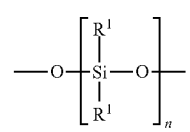

wherein the subscript n is an integer in the range from 0 to 2000; and $R^1$ is independently organic groups.

4. A compound according to claim 1, wherein A is a polysiloxane residue having the formula (V):

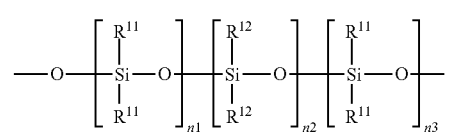

in which the units are arranged blockwise or randomly and in any order, and wherein $R^{11}$ is a monovalent aliphatic group;

$R^{12}$ is a monovalent aromatic group;

the subscripts n1, n2 and n3 are integers independently ranging from n1=0 to 2000;

n2=0 to 2000; and n3=0 to 2000; with the proviso that n1+n2+n3=n, where n is 1 to 2000.

5. A compound according to claim 1, which is selected from the group consisting of the formulas (VII) and (VIII):

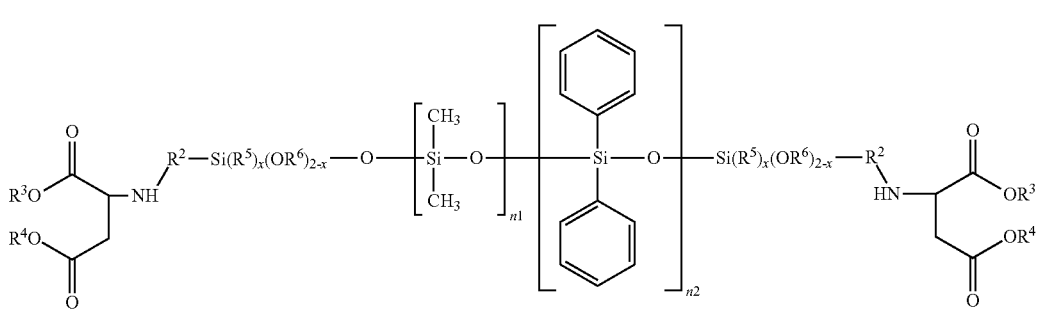

and

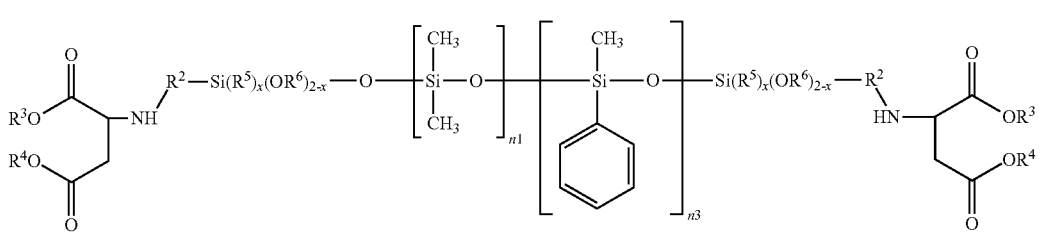
(VIII)

wherein
- $R^2$ is independently a divalent straight chain alkylene group having from 1 to 10 carbon atoms or a branched chain alkylene group having from 3 to 10 carbon atoms;
- $R^3$ and $R^4$ are independently selected from the group consisting of alkyl having from 1 to 4 carbon atoms; and
- $R^5$ and $R^6$ are independently an alkyl group,
- n1 is 1 to 1000, n2 is 1 to 1000 and n3 is 1 to 1000, with the proviso that n1+n2=n, and n1+n3=n, where n is 2 to 2000,
- and wherein the dimethylsiloxy, diphenylsiloxy and methylphenylsiloxy groups can be arranged in any order.

6. A compound of the formula (I):

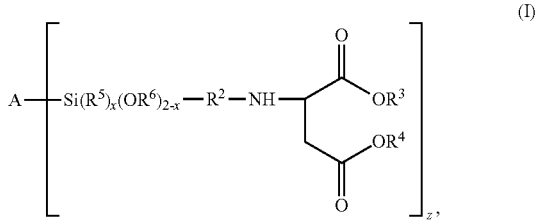
(I)

wherein
- A is oxygen (—O—) or a polyorganosiloxanyl residue comprising at least one siloxy unit selected from the group consisting of $R^1{}_3SiO_{1/2}$, $R^1{}_2SiO_{2/2}$, $R^1SiO_{3/2}$ and $SiO_{4/2}$, wherein $R^1$ is an organic group and the polyorganosiloxanyl residue is bonded to Si via an oxygen atom, with the provisos that (i) if A is oxygen (—O—), then z is 2, and (ii) if A is a polyorganosiloxanyl residue, then the polyorganosiloxanyl residue contains at least two siloxy groups which can bond to the silicon atom;
- $R^2$ is 2,2-dimethylbutylene bound in particular to the Si and N atoms as shown schematically below:

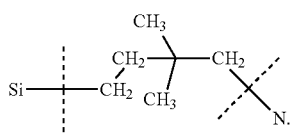

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;

each $R^5$ and $R^6$ is independently selected from the group consisting of a straight chain alkyl group of from 1 to 10 carbon atoms, a branched chain alkyl group having from 3 to 10 carbon atoms and a group having from 3 to 10 carbon atoms;

x is an integer independently 0 or 1 and z is an integer independently from 2 to 8.

7. A compound of claim 1, wherein Z is 2.

8. A compound of claim 1, wherein $R^2$ is selected from the group consisting of methylene, propylene, 2-methylpropylene, 2,2-dimethylbutylene, and mixtures thereof.

9. Method for the manufacture of crosslinkable compositions, comprising using a compound according to claim 1, and adding polyisocyanates.

10. Curable composition comprising at least one compound according to claim 1.

11. Cured compositions obtained by curing the curable composition according to claim 10.

12. Method for the manufacture of paints, coatings, adhesives, foams, encapsulants, polyurethane vacuum casting resins, polyurethane quick cast resins, elastomer curing PU cast resins, electrical potting compounds, edge casting compounds; polyurethane articles, mattresses, shoe soles, gaskets, hoses, floors, insulating materials, paints, adhesives, sealants, skis, car seats, running tracks in stadiums, dashboards, casting compounds, latex-free condoms or cast floors, comprising using the curable composition according to claim 10.

13. Articles comprising the cured compositions according to claim 11.

14. A coating composition comprising at least one compound according to claim 1.

15. A coating obtained by curing the curable composition according to claim 10.

16. Composite articles, comprising at least one substrate having on at least a part of the surface thereof a cured composition according to claim 11, wherein the substrate is selected from the group consisting of metal, plastic, concrete and wood.

17. A process for the manufacture of the compounds according to claim 1, said process selected from the group consisting of processes (A) to (D), wherein:

Process (A) comprises
(a) reacting a silane compound of the formula (XVII):

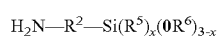 (XVII);

with a compound of the formula (XVIII):

 (XVIII)

to obtain an intermediate compound of the formula (XIX):

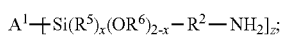  (XIX)

and
(b) reacting the intermediate compound of step (a) with a compound of the formula (XX):

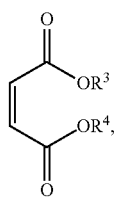  (XX)

to obtain the aspartic ester-functional polysiloxane of the formula (Ia):

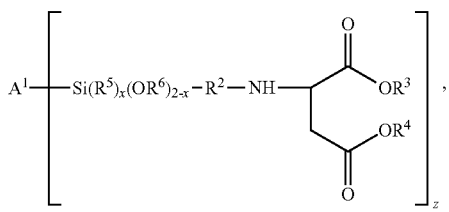  (Ia)

wherein
- $A^1$ is a polyorganosiloxanyl residue comprising at least one siloxy unit selected from the group consisting of $R^1{}_3SiO_{1/2}$, $R^1{}_2SiO_{2/2}$, $R^1SiO_{3/2}$ and $SiO_{4/2}$ and $R^1$ is an organic group and the polyorganosiloxanyl residue is bonded to Si via an oxygen atom, and the polyorganosiloxanyl residue $A^1$ contains at least two siloxy groups which can bond to the silicon atom;
- each $R^2$ is independently selected from the group consisting of a straight chain alkyl group having from 1 to 10 carbon atoms, a branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom;
- each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;
- each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;
- x is an integer independently 0 or 1; and
- z is an integer independently from 2 to 8, Process (B) comprises:
(a) reacting a silane compound of the formula (XVII):

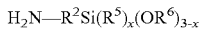  (XVII)

with a compound of the formula (XX):

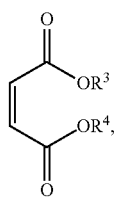  (XX)

to obtain an intermediate compound of the formula (XXI):

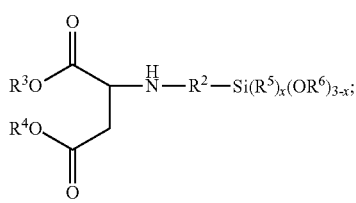  (XXI)

and
(b) reacting the intermediate compound of the formula (XXI) from step (a), with a compound of the formula (XVIII):

$A^1(OH)_z$  (XVIII)

to obtain the aspartic ester-functional polysiloxane of the formula (Ia):

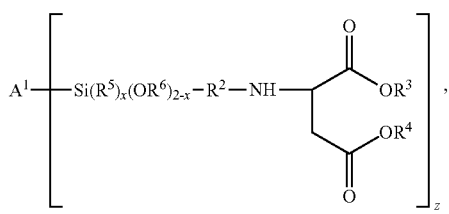  (Ia)

wherein $A^1$ is a polyorganosiloxanyl residue comprising at least one siloxy unit selected from the group consisting of $R^1{}_3SiO_{1/2}$, $R^1{}_2SiO_{2/2}$, $R^1SiO_{3/2}$ and $SiO_{4/2}$ and $R^1$ is an organic group and the polyorganosiloxanyl residue is bonded to Si via an oxygen atom, and the polyorganosiloxanyl residue $A^1$ contains at least two siloxy groups which can bond to the silicon atom;
- each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atoms, an aryl group having from 6 to 12 carbon atoms, an aralkyl group having from 7 to 10 carbon atoms and an arenyl group having from 7 to 10 carbon atom;
- each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;
- each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;
x is an integer independently 0 or 1; and
z is an integer independently from 2 to 8,
Process (C) comprises
(a) reacting a silane compound of the formula (XVII):

(XVII)

with water to obtain an intermediate compound of the formula (XXII):

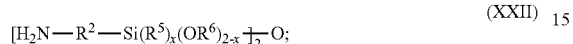

(XXII)

and
(b) reacting the intermediate compound of the formula (XXII) in step (b) with a compound of the formula (XX):

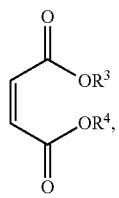

(XX)

to obtain a compound of the formula (I):

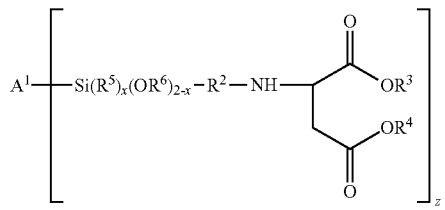

(I)

wherein
A is oxygen;
each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom;
each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;
each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;
x is an integer independently 0 or 1; and
z is 2, and
Process (D) comprises
(a) reacting a silane compound of the formula (XXI):

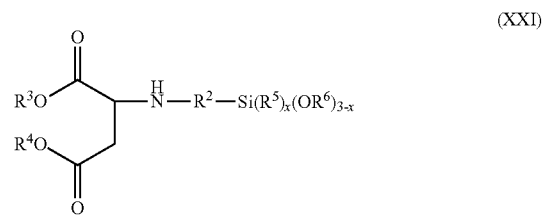

(XXI)

with water to obtain a compound of the formula (I):

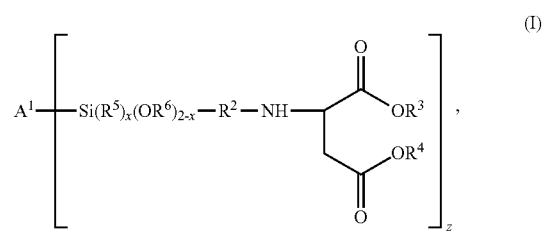

(I)

wherein
A is oxygen;
each $R^2$ is independently selected from the group consisting of a straight chain alkyl group having from 1 to 10 carbon atoms, branched chain alkyl group having from 3 to 10 carbon atoms, a cycloalkyl group having from 3 to 10 carbon atom, an aryl group having from 6 to 12 carbon atoms, an aralkyl group having from 7 to 10 carbon atoms and an arenyl group having from 7 to 10 carbon atom;
each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;
each $R^5$ and $R^6$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms;
x is an integer independently 0 or 1; and
z is 2.

18. Curable composition according to claim 10, additionally comprising:
at least one polyisocyanate, and
optionally one or more isocyanate-reactive compounds different from the compound of formula (I) and selected from the group consisting of polyols, polythiols and polyamines.

19. Composite articles, comprising at least one substrate having on at least a part of the surface thereof a coating of claim 15, wherein the substrate is selected from the group consisting of metal, plastic, concrete and wood.

* * * * *